United States Patent
Kachare et al.

(10) Patent No.: US 12,222,791 B2
(45) Date of Patent: *Feb. 11, 2025

(54) METHOD AND APPARATUS FOR PERFORMING POWER ANALYTICS OF A STORAGE SYSTEM

(71) Applicant: Samsung Electronics Co., Ltd., Suwon-si (KR)

(72) Inventors: Ramdas P. Kachare, Pleasanton, CA (US); Wentao Wu, Milpitas, CA (US); Sompong Paul Olarig, Pleasanton, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,933

(22) Filed: Dec. 4, 2020

(65) Prior Publication Data

US 2021/0089102 A1 Mar. 25, 2021

Related U.S. Application Data

(60) Division of application No. 16/167,306, filed on Oct. 22, 2018, now Pat. No. 11,500,439, which is a
(Continued)

(51) Int. Cl.
*G06F 1/3234* (2019.01)
*G06F 1/3221* (2019.01)
(Continued)

(52) U.S. Cl.
CPC .......... *G06F 1/3268* (2013.01); *G06F 1/3221* (2013.01); *G06F 1/3225* (2013.01);
(Continued)

(58) Field of Classification Search
CPC ... G06F 1/263; G06F 1/28; G06F 1/39; G06F 1/32; G06F 1/3203; G06F 1/3206;
(Continued)

(56) References Cited

U.S. PATENT DOCUMENTS 6,574,740 B1 * 6/2003 Odaohhara ........... G06F 1/3265
713/323
6,785,827 B2 8/2004 Layton et al.
(Continued)

FOREIGN PATENT DOCUMENTS

CN 1887003 A 12/2006
CN 101477399 A 7/2009
(Continued)

OTHER PUBLICATIONS

MPS, The Future of Analog IC Technology, "PMU for SSD Evaluation Board", EV5505A-L-00A, Rev. 1.1, Mar. 24, 2015, 6 pages, www.MonolithicPower.com.
(Continued)

*Primary Examiner* — Thomas J. Cleary
(74) *Attorney, Agent, or Firm* — Lewis Roca Rothgerber Christie LLP

(57) ABSTRACT

A storage system comprises one or more storage devices, power supplies supplying power to the storage device, a processor that performs in response to determining that the total power consumption of the one or more storage devices is less than a first percentage threshold of a load of the active power supplies, deactivating one or more of the active power supplies until the total power consumption is equal to or greater than the first percentage threshold of a load of each of the active power supplies, and in response to determining that the total power consumption is equal to or greater than a second percentage threshold of a load of each of the active power supplies, activating one or more of the deactivated
(Continued)

ones of the power supplies until the total power consumption is less than the second percentage threshold of the load of each of the active power supplies.

17 Claims, 14 Drawing Sheets

Related U.S. Application Data continuation-in-part of application No. 15/975,463, filed on May 9, 2018, now Pat. No. 11,481,016.

(60) Provisional application No. 62/713,466, filed on Aug. 1, 2018, provisional application No. 62/638,035, filed on Mar. 2, 2018.

(51) Int. Cl.
| | | |
|---|---|---|
| *G06F 1/3225* | (2019.01) | |
| *G06F 1/3287* | (2019.01) | |
| *G06F 11/30* | (2006.01) | |
| *G06F 11/34* | (2006.01) | |
| G06F 1/26 | (2006.01) | |
| G06F 1/28 | (2006.01) | |
| G06F 1/30 | (2006.01) | |
| G06F 11/20 | (2006.01) | |

(52) U.S. Cl.
CPC ........ *G06F 1/3287* (2013.01); *G06F 11/3034* (2013.01); *G06F 11/3062* (2013.01); *G06F 11/3476* (2013.01); *G06F 1/263* (2013.01); *G06F 1/28* (2013.01); *G06F 1/30* (2013.01); *G06F 11/2015* (2013.01); *G06F 2201/81* (2013.01)

(58) Field of Classification Search
CPC .... G06F 1/3215; G06F 1/3221; G06F 1/3225; G06F 1/325; G06F 1/3256; G06F 1/3268; G06F 1/3275; G06F 1/3287; G06F 1/3296; G06F 11/2015; G06F 11/3062; G06F 11/3476; G06F 2201/81; G06F 11/3034; G06F 11/3037; G06F 11/3058; G06F 1/30; G06F 3/06; Y02D 10/00; Y02D 30/50
See application file for complete search history.

(56) References Cited

U.S. PATENT DOCUMENTS

| | | | |
|---|---|---|---|
| 7,064,994 B1* | 6/2006 | Wu | G06F 1/206 |
| | | | 702/132 |
| 7,269,751 B2 | 9/2007 | Janakiraman et al. | |
| 7,426,597 B1 | 9/2008 | Tsu et al. | |
| 7,539,881 B2* | 5/2009 | Shaw | G06F 1/3203 |
| | | | 713/300 |
| 7,904,115 B2 | 3/2011 | Hageman et al. | |
| 7,971,084 B2 | 6/2011 | Morgan et al. | |
| 8,051,316 B2 | 11/2011 | Roberts et al. | |
| 9,235,252 B2 | 1/2016 | Shrall et al. | |
| 9,292,064 B2 | 3/2016 | Grout et al. | |
| 9,417,961 B2 | 8/2016 | Dash et al. | |
| 9,477,295 B2 | 10/2016 | Jreji et al. | |
| 9,652,027 B2 | 5/2017 | Sharda et al. | |
| 10,146,293 B2 | 12/2018 | Khatib et al. | |
| 10,268,262 B2* | 4/2019 | Khatri | G06F 1/266 |
| 10,324,642 B2* | 6/2019 | Sweere | G06F 13/409 |
| 10,424,938 B2 | 9/2019 | Guo et al. | |
| 11,093,135 B1* | 8/2021 | Ali | G06F 3/0673 |
| 11,500,439 B2 | 11/2022 | Kachare et al. | |
| 11,921,555 B2* | 3/2024 | Olarig | G06F 1/3228 |
| 2003/0088798 A1 | 5/2003 | Ono et al. | |
| 2004/0215912 A1 | 10/2004 | Vergis et al. | |
| 2005/0102544 A1* | 5/2005 | Brewer | G06F 1/3203 |
| | | | 713/320 |
| 2005/0268121 A1* | 12/2005 | Rothman | G06F 3/0625 |
| | | | 713/300 |
| 2006/0149975 A1 | 7/2006 | Rotem et al. | |
| 2006/0288241 A1* | 12/2006 | Felter | G06F 1/3203 |
| | | | 713/300 |
| 2007/0028130 A1 | 2/2007 | Schumacher et al. | |
| 2007/0067657 A1* | 3/2007 | Ranganathan | G06F 1/3268 |
| | | | 713/320 |
| 2008/0043556 A1 | 2/2008 | Nale | |
| 2008/0147918 A1 | 6/2008 | Hanebutte et al. | |
| 2008/0320322 A1 | 12/2008 | Green et al. | |
| 2009/0287947 A1* | 11/2009 | DuBose | G06F 1/3203 |
| | | | 713/323 |
| 2010/0019576 A1 | 1/2010 | Buterbaugh et al. | |
| 2010/0077243 A1 | 3/2010 | Wang et al. | |
| 2010/0153590 A1 | 6/2010 | Sin et al. | |
| 2010/0164292 A1 | 7/2010 | Freeman et al. | |
| 2010/0264741 A1 | 10/2010 | Togare | |
| 2011/0029788 A1 | 2/2011 | Domingo et al. | |
| 2011/0144818 A1* | 6/2011 | Li | G06F 1/26 |
| | | | 700/291 |
| 2011/0178652 A1* | 7/2011 | Carter | G06F 1/329 |
| | | | 700/296 |
| 2012/0030489 A1 | 2/2012 | Patil et al. | |
| 2012/0117399 A1 | 5/2012 | Chan et al. | |
| 2012/0137172 A1 | 5/2012 | Gardelegen et al. | |
| 2012/0210149 A1* | 8/2012 | Carter | G06F 1/3268 |
| | | | 713/320 |
| 2012/0303993 A1 | 11/2012 | Nishtala et al. | |
| 2013/0085623 A1 | 4/2013 | Izumisawa et al. | |
| 2013/0185583 A1 | 7/2013 | Stewart et al. | |
| 2014/0003180 A1* | 1/2014 | Matsuda | G11B 5/012 |
| | | | 365/226 |
| 2014/0100706 A1 | 4/2014 | Khatri et al. | |
| 2014/0101475 A1* | 4/2014 | Berke | G06F 1/3287 |
| | | | 713/340 |
| 2014/0149760 A1* | 5/2014 | Drake | G06F 1/3206 |
| | | | 713/320 |
| 2014/0181560 A1 | 6/2014 | Muralidhar et al. | |
| 2014/0208136 A1 | 7/2014 | Rahardjo et al. | |
| 2014/0281606 A1* | 9/2014 | Evans | G06F 3/0689 |
| | | | 713/320 |
| 2014/0344947 A1 | 11/2014 | Kalyanasundharam et al. | |
| 2015/0026495 A1 | 1/2015 | Jain et al. | |
| 2015/0120874 A1 | 4/2015 | Kim et al. | |
| 2015/0121113 A1 | 4/2015 | Ramamurthy et al. | |
| 2015/0177814 A1 | 6/2015 | Bailey et al. | |
| 2015/0200566 A1 | 7/2015 | Huang et al. | |
| 2015/0249363 A1 | 9/2015 | Humphrey, Jr. et al. | |
| 2015/0261287 A1 | 9/2015 | Ishihara | |
| 2015/0309752 A1* | 10/2015 | Ellis | G06F 1/329 |
| | | | 711/103 |
| 2015/0331473 A1 | 11/2015 | Jreji et al. | |
| 2015/0338910 A1* | 11/2015 | Allen-Ware | G06F 12/0246 |
| | | | 713/320 |
| 2015/0347325 A1 | 12/2015 | Hutchison et al. | |
| 2015/0355704 A1 | 12/2015 | Grimsrud et al. | |
| 2015/0362985 A1* | 12/2015 | Thompson | G06F 1/3293 |
| | | | 713/323 |
| 2016/0014045 A1 | 1/2016 | Terai | |
| 2016/0085288 A1* | 3/2016 | Khatib | G06F 3/0659 |
| | | | 713/320 |
| 2016/0179117 A1 | 6/2016 | Eastep et al. | |
| 2016/0282892 A1 | 9/2016 | Saavedra et al. | |
| 2016/0370843 A1 | 12/2016 | Gatson et al. | |
| 2016/0378631 A1 | 12/2016 | Calio et al. | |
| 2017/0011150 A1 | 1/2017 | Sons et al. | |
| 2017/0031409 A1* | 2/2017 | Lester | G06F 3/0653 |
| 2017/0031431 A1* | 2/2017 | Khatri | G06F 1/3246 |
| 2017/0031857 A1 | 2/2017 | Qiu | |
| 2017/0160781 A1* | 6/2017 | Piga | G06F 1/3206 |
| 2017/0177262 A1* | 6/2017 | Sharma | G06F 3/0653 |
| 2017/0187186 A1 | 6/2017 | Premm et al. | |
| 2017/0235519 A1 | 8/2017 | Qiu et al. | |
| 2017/0315599 A1 | 11/2017 | Marripudi et al. | |
| 2017/0322613 A1 | 11/2017 | Lin et al. | |

(56) References Cited

U.S. PATENT DOCUMENTS

| | | | |
|---|---|---|---|
| 2018/0107258 A1* | 4/2018 | Remis | G06F 8/65 |
| 2018/0232303 A1 | 8/2018 | Roeder | |
| 2019/0018474 A1* | 1/2019 | Bacchus | G06F 13/1689 |
| 2019/0018611 A1 | 1/2019 | Kim | |
| 2019/0065089 A1 | 2/2019 | Myers et al. | |
| 2019/0065243 A1 | 2/2019 | Eckert | |
| 2019/0196742 A1 | 6/2019 | Yudanov et al. | |
| 2019/0214829 A1 | 7/2019 | Huang et al. | |
| 2019/0272012 A1 | 9/2019 | Kachare et al. | |
| 2019/0272021 A1 | 9/2019 | Olarig | |
| 2019/0310786 A1 | 10/2019 | Hodes et al. | |
| 2020/0125159 A1 | 4/2020 | Messick et al. | |
| 2020/0310886 A1* | 10/2020 | Rajamani | G06F 9/45558 |
| 2020/0333870 A1* | 10/2020 | Vaysman | G06F 1/3275 |
| 2021/0026428 A1* | 1/2021 | Olarig | G06F 1/3228 |
| 2021/0089102 A1 | 3/2021 | Kachare et al. | |
| 2021/0223851 A1* | 7/2021 | Kim | G06F 1/324 |
| 2021/0232198 A1* | 7/2021 | Kachare | G06F 11/3062 |
| 2022/0229483 A1 | 7/2022 | Shabbir et al. | |
| 2023/0161494 A1* | 5/2023 | Benisty | G06F 3/0647 |
| | | | 711/103 |

FOREIGN PATENT DOCUMENTS

| | | |
|---|---|---|
| CN | 102290854 A | 12/2011 |
| CN | 104798004 A | 7/2015 |
| CN | 104951384 | 9/2015 |
| CN | 105359057 A | 2/2016 |
| CN | 105487814 A | 4/2016 |
| JP | 2013-257650 A | 12/2013 |
| JP | 2015-175630 A | 10/2015 |
| KR | 10-2006-0009264 A | 1/2006 |
| KR | 10-2016-0059430 A | 5/2016 |

OTHER PUBLICATIONS

U.S. Office Action dated Jul. 31, 2020, issued in U.S. Appl. No. 15/975,463 (17 pages).
U.S. Final Office Action dated Jan. 11, 2021, issued in U.S. Appl. No. 15/975,463 (19 pages).
U.S. Notice of Allowance dated Mar. 10, 2021, issued in U.S. Appl. No. 16/167,306 (10 pages).
U.S. Office Action dated Apr. 23, 2021, issued in U.S. Appl. No. 15/975,463 (20 pages).
U.S. Final Office Action dated Aug. 5, 2021, issued in U.S. Appl. No. 15/975,463 (23 pages).
Notice of Allowance for U.S. Appl. No. 16/167,306 dated May 3, 2022, 9 pages.
Office Action for U.S. Appl. No. 17/233,303 dated Apr. 27, 2022, 28 pages.
U.S. Office Action from U.S. Appl. No. 15/975,463, dated Dec. 7, 2021, 25 pages.
U.S. Notice of Allowance dated Aug. 18, 2022, issued in U.S. Appl. No. 16/167,306 (8 pages).
U.S. Notice of Allowance dated Aug. 23, 2022, issued in U.S. Appl. No. 15/975,463 (7 pages).
1 U.S. Notice of Allowance dated Jul. 25, 2022, issued in U.S. Appl. No. 15/975,463 (8 pages).
Strass, Hermann. "An Introduction to NVMe". 2016. Seagate Technology LLC. (Year: 2016).
U.S. Final Office Action dated Dec. 5, 2022, issued in U.S. Appl. No. 17/233,303 (33 pages).
"Samsung SSD 950 PRO". 2015. Samsung Electronics Co. Ltd. (Year: 2015); Advisory Action issued in U.S. Appl. No. 17/233,303.
U.S. Office Action dated Mar. 9, 2023, issued in U.S. Appl. No. 18/055,331 (17 pages).
U.S. Advisory Action dated Mar. 21, 2023, issued in U.S. Appl. No. 17/233,303 (4 pages).
U.S. Notice of Allowance dated May 4, 2023, issued in U.S. Appl. No. 17/233,303 (10 pages).
Advisory Action for U.S. Appl. No. 18/055,331 dated Nov. 7, 2023, 3 pages.
Final Rejection for U.S. Appl. No. 18/055,331 dated Aug. 2, 2023, 37 pages.
Notice of Allowance for U.S. Appl. No. 17/233,303 dated Nov. 15, 2023, 9 pages.
Office Action for U.S. Appl. No. 17/233,303 dated Aug. 2, 2023, 23 pages.
Korean Examination report dated Dec. 26, 2023, issued in Korean Patent Application No. 10-2019-0005440 (5 pages).
US Office Action dated Jan. 30, 2024, issued in U.S. Appl. No. 18/055,331 (51 pages).
US Notice of Allowance dated Feb. 26, 2024, issued in U.S. Appl. No. 17/233,303 (10 pages).
Chinese Office Action dated Apr. 3, 2024, issued in Chinese Patent Application No. 201910159333.1, 12 pages.
US Final Office Action dated May 15, 2024, issued in U.S. Appl. No. 18/055,331 (40 pages).
US Advisory Action dated Jul. 26, 2024, issued in U.S. Appl. No. 18/055,331 (4 pages).
Chinese Office Action dated May 11, 2024, issued in Chinese Patent Application No. 201910145834.4 (8 pages).
US Office Action dated Oct. 30, 2024, issued in U.S. Appl. No. 18/055,331 (41 pages).

* cited by examiner

METHOD AND APPARATUS FOR PERFORMING POWER ANALYTICS OF A STORAGE SYSTEM

CROSS-REFERENCE TO RELATED APPLICATION(S)

This application is a divisional of U.S. patent application Ser. No. 16/167,306, filed Oct. 22, 2018, which claims the benefit of U.S. Provisional Patent Application Ser. No. 62/713,466, filed Aug. 1, 2018, the contents of both of which are hereby incorporated by reference in their entirety.

U.S. patent application Ser. No. 16/167,306, filed Oct. 22, 2018, is also a continuation-in-part of U.S. patent application Ser. No. 15/975,463, filed May 9, 2018, entitled "METHOD AND APPARATUS FOR SELF-REGULATING POWER USAGE AND POWER CONSUMPTION IN ETHERNET SSD STORAGE SYSTEMS", which claims priority to and the benefit of U.S. Provisional Application No. 62/638,035, filed Mar. 2, 2018, the entire contents of both of which are incorporated herein by reference.

BACKGROUND

Many companies provide cloud-based storage to end users so that end users will have the ability to remotely access their stored data. Such companies generally take advantage of Ethernet-attached solid state drives (eSSDs) for their storage requirements. In particular, Ethernet-attached non-volatile memory express NVMe (Non-Volatile Memory Express) SSDs (e.g., NVMe Over Fabrics [NVMe-oF] storage devices) are considered an emerging and disruptive technology in this area.

Cloud-based storage providers typically charge users for storing their data on a monthly or annual basis based on the total storage space allocated to the user and either the average cost of energy consumed by all users or the maximum power consumption capable of being consumed by the user based on the system. For example, for two users who have purchased the same amount of cloud storage space, a user who stores only a small amount of data relative to the total purchased storage space and only stores data on an infrequent basis will be charged the same as a user who is regularly removing and added new data and using the majority of his/her purchased storage space. Ideally, users should be charged for storage based on the energy resources actually consumed. However, there is no accurate method for calculating the power consumption of individual users, or calculating power consumption in real time.

The above information disclosed in this Background section is only for enhancement of understanding of the background of the disclosure and therefore it may contain information that does not constitute prior art.

SUMMARY

Aspects of embodiments of the present invention are directed to a storage system, and a method of operating the same, capable of managing (e.g., optimizing) operation of the power supplies of the system by dynamically monitoring their operation and ensuring that active power supplies operate in their high power-efficiency range.

Aspects of embodiments of the present invention are directed to a storage system, and a method of operating the same, capable of managing (e.g., optimizing) power usage of storage devices of a storage bank by dynamically adjusting their maximum power caps based on the workload of the storage bank.

According to some embodiments of the present invention, there is provided a storage system comprising: one or more storage devices; a plurality of power supplies configured to supply power to the storage device; a processor; and a memory having stored thereon instructions that, when executed by the processor, cause the processor to perform: determining whether multiple power supplies of the plurality of power supplies are active; in response to determining that multiple power supplies are active: determining a total power consumption of the one or more storage devices; in response to determining that the total power consumption is less than a first percentage threshold of a load of active ones of the power supplies, deactivating the active ones of the power supplies one by one until the total power consumption is equal to or greater than the first percentage threshold of a load of each of the active ones of the power supplies; and in response to determining that the total power consumption is equal to or greater than a second percentage threshold of a load of each of the active ones of the power supplies, activating deactivated ones of the power supplies one by one until the total power consumption is less than the second percentage threshold of the load of each of the active ones of the power supplies.

In some embodiments, the determining the total power consumption of the one or more storage devices comprises: obtaining an actual power consumption of each storage device of the one or more storage devices from the storage device or a corresponding power meter; and summing the actual power consumption of each storage device to obtain the total power consumption.

In some embodiments, the obtaining the actual power consumption of each storage device comprises: retrieving power measurement information from a power log corresponding to the storage device, wherein the power measurement information is measured, and recorded in the power log, by the corresponding power meter.

In some embodiments, the corresponding power meter is internal to the storage device.

In some embodiments, the corresponding power meter is external to and coupled to the storage device.

In some embodiments, the first percentage threshold of the load of each of the active ones of the power supplies is 40% of the load of each of the active ones of the power supplies.

In some embodiments, the second percentage threshold of the load of each of the active ones of the power supplies is 90% of the load of each of the active ones of the power supplies.

In some embodiments, the instructions further cause the processor to perform: determining whether only one power supply of the plurality of power supplies is in a high availability mode; and in response to determining that only one power supply of the plurality of power supplies is in a high-availability mode, generating a warning message indicating that the one power supply is in high-availability mode.

In some embodiments, the deactivating the active ones of the power supplies one by one comprises: deactivating an active power supply of the active ones of the power supplies; determining that the total power consumption of the one or more storage devices is less than the first percentage threshold of a load of the active ones of the power supplies; and in response to the determining, deactivating an other active power supply of the active ones of the power supplies.

In some embodiments, the activating the deactivated ones of the power supplies one by one comprises: activating a deactivated power supply of the power supplies; determining that the total power consumption of the one or more storage devices is equal to or greater than the second percentage threshold of a load of the active ones of the power supplies; and in response to the determining, enabling an other deactivated power supply of the power supplies.

According to some embodiments of the present invention, there is provided a method of managing a storage system comprising one or more storage devices and a plurality of power supplies configured to supply power to the storage device, the method comprising: determining, by a processor of the storage device, whether multiple power supplies of the plurality of power supplies are active; in response to determining that multiple power supplies are active: determining, by the processor, a total power consumption of the one or more storage devices; in response to determining that the total power consumption is less than a first percentage threshold of a load of active ones of the power supplies, deactivating, by the processor, the active ones of the power supplies one by one until the total power consumption is equal to or greater than the first percentage threshold of a load of each of the active ones of the power supplies; and in response to determining that the total power consumption is equal to or greater than a second percentage threshold of a load of each of the active ones of the power supplies, activating, by the processor, deactivated ones of the power supplies one by one until the total power consumption is less than the second percentage threshold of the load of each of the active ones of the power supplies.

According to some embodiments of the present invention, there is provided a storage system comprising: a plurality of storage devices, each storage device of the plurality of storage devices being configured to measure a power consumption of the storage device; a processor in communication with the plurality of storage devices; and a memory having stored thereon instructions that, when executed by the processor, cause the processor to perform: determining whether one or more first storage devices of the plurality of storage devices are idle or are in an idle state; in response to determining that the one or more first storage devices are in an idle state, instructing the one or more first storage devices to operate at lower power caps; determining whether one or more second storage devices of the plurality of storage devices are consuming power under a threshold power level; and in response to determining that the one or more second storage devices are consuming power under the threshold power level, instructing the one or more second storage devices to operate at or below the threshold power level.

In some embodiments, the determining whether one or more first storage devices are in idle state: obtaining power consumption of each storage device of the plurality of storage devices by retrieving a corresponding power log from the storage device; comparing the power consumption of each storage device with an idle power level; and determining whether the one or more first storage devices have power consumptions that are at or below the idle power level.

In some embodiments, the power log stores actual power consumption of the corresponding storage device as measured by a corresponding power meter.

In some embodiments, instructing the one or more first storage devices to operate at the lower power caps comprises: instructing the one or more first storage devices to change power states to a power state having a lower maximum power rating.

In some embodiments, determining whether the one or more second storage devices of the plurality of storage devices are consuming power under a threshold power level comprises: obtaining power consumption of each storage device of the plurality of storage devices by retrieving a corresponding power log from the storage device; comparing the power consumption of each storage device with the threshold power level; and determining whether the one or more first storage devices have power consumptions that below the threshold power level.

In some embodiments, instructing the one or more second storage devices to operate at or below the threshold power level comprises: instructing the one or more second storage devices to change power states to a power state having a maximum power rating corresponding to the threshold power level.

In some embodiments, the instructions further cause the processor to perform: determining whether one or more storage slots are not occupied by any storage device; and in response to determining that the one or more storage slots are not occupied by any storage device: identifying one or more power meters associated with the one or more storage slots; and instructing the identified one or more power meters to operate at lower power cap.

In some embodiments, instructing the identified one or more power meters to operate at lower power cap comprises: instructing the one or more power meters to operate at a lowest power state.

In some embodiments, instructing the identified one or more power meters to operate at lower power cap comprises: instructing the one or more power meters to deactivate.

BRIEF DESCRIPTION OF THE DRAWINGS

Further features and aspects will become apparent and will be best understood by reference to the following detailed description reviewed in conjunction with the drawings. In the drawings.

DETAILED DESCRIPTION

Figure 1:
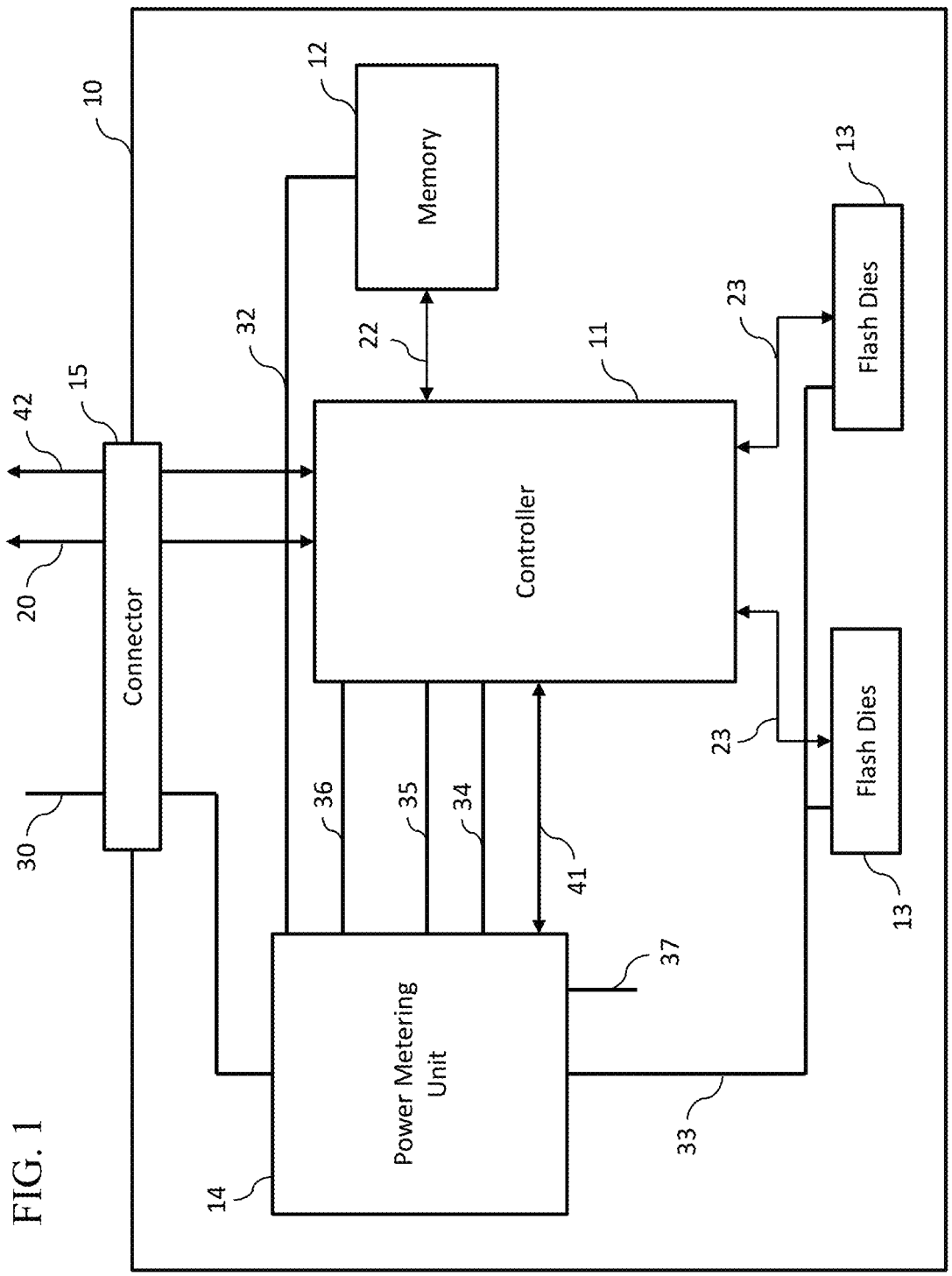
FIG. 1 is an internal block diagram of a storage device according to an embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a storage device, such as an SSD (e.g., NVMe or NVMe-oF SSD), that is capable of reporting its actual power consumption to the local service processor, for example, a baseboard management controller (BMC). This enables the local service processor to provide power profiles and consumption of the storage device. In some embodiments, the storage device can report to the local service processor or BMC via a system management bus (SMBus) or a Peripheral Component Interconnect Express (PCIe), and can report by one of various protocols, such as by a Management Component Transport Protocol (MCTP) or by a NVMe Management Interface protocol for NVMe SSDs storage devices. In some embodiments, the storage system may be an NVMe-oF based system. Further embodiments include a storage system including several storage devices in which each storage device is capable of reporting its actual power consumption to the local service processor. In such a system, the local service processor can provide power profiles and analytics of the storage system and individual storage devices in the system.

FIG. 1 depicts an internal block diagram of a storage device 10 according to an embodiment of the present invention. While diagram depicts features relevant to the illustrated embodiment of the invention, the storage device 10 may include additional components. In some embodiments, the storage device 10 may be an SSD, an Ethernet SSD (eSSD), an NVMe SSD, an NVMe-oF SSD, a SAS or SATA SSD.

The storage device 10 includes internal components, including a controller 11, a memory 12, flash dies 13, a power metering unit (PMU) 14 and a connector 15. The controller 11, as known as the processor, implements firmware to retrieve and store data in the memory 12 and flash dies 13 and to communicate with a host computer. In some embodiments, the controller 11 may be an SSD controller, an ASIC SSD controller, or an NVMe-oF/EdgeSSD controller. The memory 12 can be a random access memory such as DRAM or MRAM and the flash dies 13 may be NAND flash memory devices, though the invention is not limited thereto. The controller 11 can be connected to the memory 12 via memory channel 22 and can be connected to the flash dies 13 via flash channels 23. The controller 11 can communicate with a host computer via a host interface 20 that connects the controller 11 to the host computer through the connector 15. In some embodiments, the host interface 20 may be a PCIe connection, an Ethernet connection or other suitable connection. The connector 15 may be U.2/M.2 connectors or other suitable connector(s). The PMU 14 allows the storage device 10 to support power management capabilities by measuring actual power consumption of the storage device 10.

The storage device 10 is supplied power through the connector 15 via power rails or pins 30. In examples in which the connector 15 is a PCIe connector, the pins 30 may be 12 V and 30 V pins. In examples in which the connector 15 is a U.2 connector, the pins 30 may be 5 V and 12 V pins (an NVMe SSD may only use the 12 V pin, while a SAS or SATA SSD may use both rails). Power rails 30 supply power to the various components of the storage device 10. For example, the power rail may supply power to the various components of the storage device 10 via the PMU 14 and various intermediary voltage rails. An embodiment of this is shown in FIG. 1, in which the power rails 30 supply power to the PMU 14, which then distributes power to other components of the storage device 10. For example, the PMU 14 drives power to the flash dies 13 via flash voltage rails 33. The PMU 14 may similarly drive all power rails to the memory 12 via memory voltage rails 32. Power can be supplied to the controller 11 by the PMU 14 through multiple voltage rails, such as, for example, a core voltage rail 34, an I/O voltage rail 35 and one or more other voltage rails 36. Additional voltage rails, such as an additional voltage rail 37, may be included to connect other various components that may be included in the storage device 10. The various voltage rails 30, 33, 34, 35, 36, 37 used in the storage device 10 can be in a range of from 12V down to 0.6V, including 12V and/or 3.3V rails, for example, when the storage device 10 is an NVMe SSD. While, in the embodiments shown in FIG. 1, the voltage regulators are built into (or integrated with) the PMU 14, embodiments of the present invention are not limited thereto, and the voltage regulators may be external to the PMU 14.

In addition to supplying power to the storage device 10, power supply rails 20 are provided by the PMU 14 inside the storage device 10 to generate power consumption measurements ("power measurements") of the various voltages rails used by the components of the storage device 10, for example, used by components such as the controller 11, the flash dies 13, the memory 12 and other various components that may be included in the storage device 10. In some embodiments, the PMU 14 can be programmed to support get/set Power State by Power Info from the host computer or BMC.

The PMU 14 can measure the amount of current drawn on various voltage rails it is driving, for example, voltage rails 32, 33, 34, 35, 36 and 37. The PMU can output power measurements including the average, minimum and maximum voltage usage by the voltage rails 32, 33, 34, 35, 36 and 37 of the storage device 10. In some embodiments, the PMU 14 can meter each voltage rail 32, 33, 34, 35, 36 and 37 individually, with the summation of all voltage rails 32, 33, 34, 35, 36 and 37 used by the storage device 10 being the total power consumed by the storage device 10. The power measurements metered at the PMU 14 can be read by the controller 11 using a PMU/controller interface 41. In some embodiments, the PMU/controller interface 41 may be an I2C/SMBus. The controller 11 can then provide these power measurements to a local service processor 50 (see FIG. 3), such as a BMC, via either the host interface 20 or a separate controller/host interface 42. If a separate controller/host interface or side band bus 42 is used, that interface may be an I2C/SMBus. If the controller/host interface 42 is a PCIe connection, the controller 11 can provide power measurements to the local service processor 50 via NVMe-MI or MCTP protocols, as shown in FIG. 4. The PMU 14 can report/output the power measurements periodically as specified by the local service processor 50 or passively keep track via internal counters which are accessible to the local service processor 50.

Figure 2:
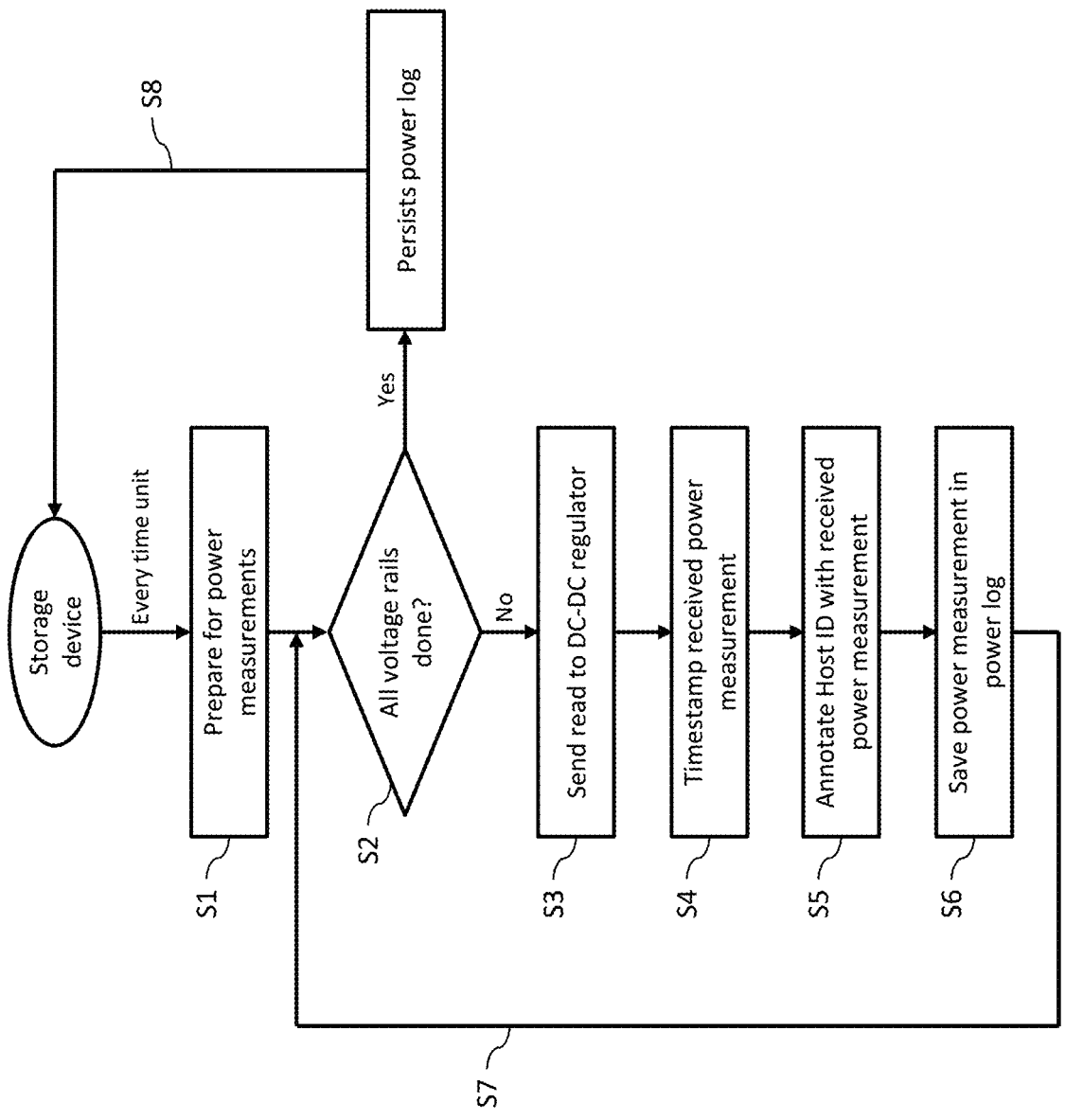
FIG. 2 is a flow chart of a method for collecting power consumption measurements from a power measurement unit in the storage device of FIG. 1.

FIG. 2 is a flow chart of a method for collecting power consumption measurements from the PMU 14 of the storage device 10. As shown in FIG. 2, power measurements can be read at predetermined intervals. For example, the power measurements can be read from the PMU 14 of the storage device 10 at the user's configurable frequency such as 1 second, 5 seconds, more than 5 seconds, or every few minutes. In other embodiments, that storage device 10 can read the power measurements only as needed (see, e.g., FIGS. 8 and 9), for example, at the completion of a specific job. The frequency at which the power measurements are read is hereinafter called a time unit.

For every time unit, the controller 11 prepares (S1) to receive power measurements from the PMU 14 for the various voltage rails 30, 33, 34, 35, 36, 37. The controller 11 queries (S2) the PMU 14 to determine if power measurements from all rails have been completed. If no, then a read request (S3) is sent to a DC-DC regulator at the PMU 14 corresponding to a voltage rail for which power measurements have not been received (the PMU 14 may include a number of DC-DC regulators each corresponding to unique voltage rail). This read request may be send via an I2C protocol via the PMU/controller interface 41. When the power measurement is received from the PMU 14, the power measurement is then annotated with a timestamp (S4) and a Host ID (S5). The received power measurement is then saved (S6) to a power log. The power log may include internal register(s) or may be included as part of the PMU's embedded non-volatile memory.

Once the received power measurement is saved, the PMU 14 is again queried (S7) until all power measurements are received from the various voltage rails 30, 33, 34, 35, 36, 37.

Once all power measurements are complete and the annotated power measurements are saved in the power log, these power measurements persist (S8) in the power log through resets and power cycles.

In addition to the above annotations, the power log pages can also include any or all of the following: Namespace ID, NMV Set, read I/Os, write I/Os, SQ ID, Stream ID, and other suitable parameters. The controller 11 also implements actual power (AP) registers which are accessible by the local service processor 50. This allows a variety of parameters associated with the storage device and the power measurements to be mapped with fine granularity.

In some embodiments, the power log can be special proprietary or vendor defined log pages. The power log can be read by the local service processor 50 using existing standard protocols through either the host interface 20 or the separate controller/host interface or side-band bus 42, whichever is used. For example, the power log can be read by a BMC using the NVMe-MI protocol via the controller/host interface 42, which may be a SMBus or PCIe.

The above method provides dynamic, real-time output of actual power consumption measurements without affecting the I/O of the storage device. With the power measurement information, the local service processor can implement power budgets and allocate power to the storage device based on its actual power usage. For example, the local service processor can implement power budgets similar to existing industry standards for allocated power budget registers. Also, the storage device can report real time power consumption to system management software, such as Samsung's DCP or Redfish.

Figure 3:
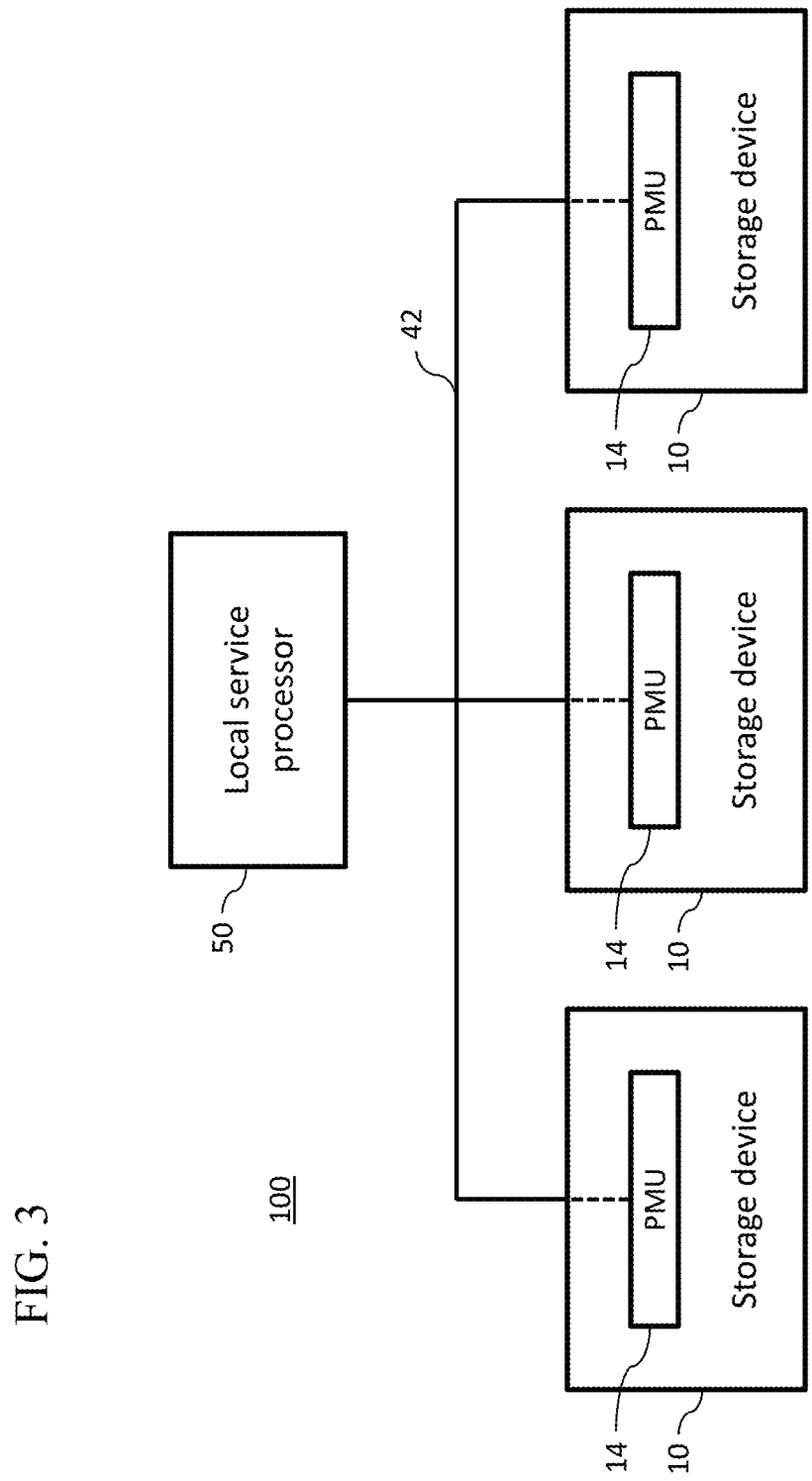
FIG. 3 is a schematic diagram of a storage system incorporating multiple storage devices that are capable of providing power measurements.
Figure 4:
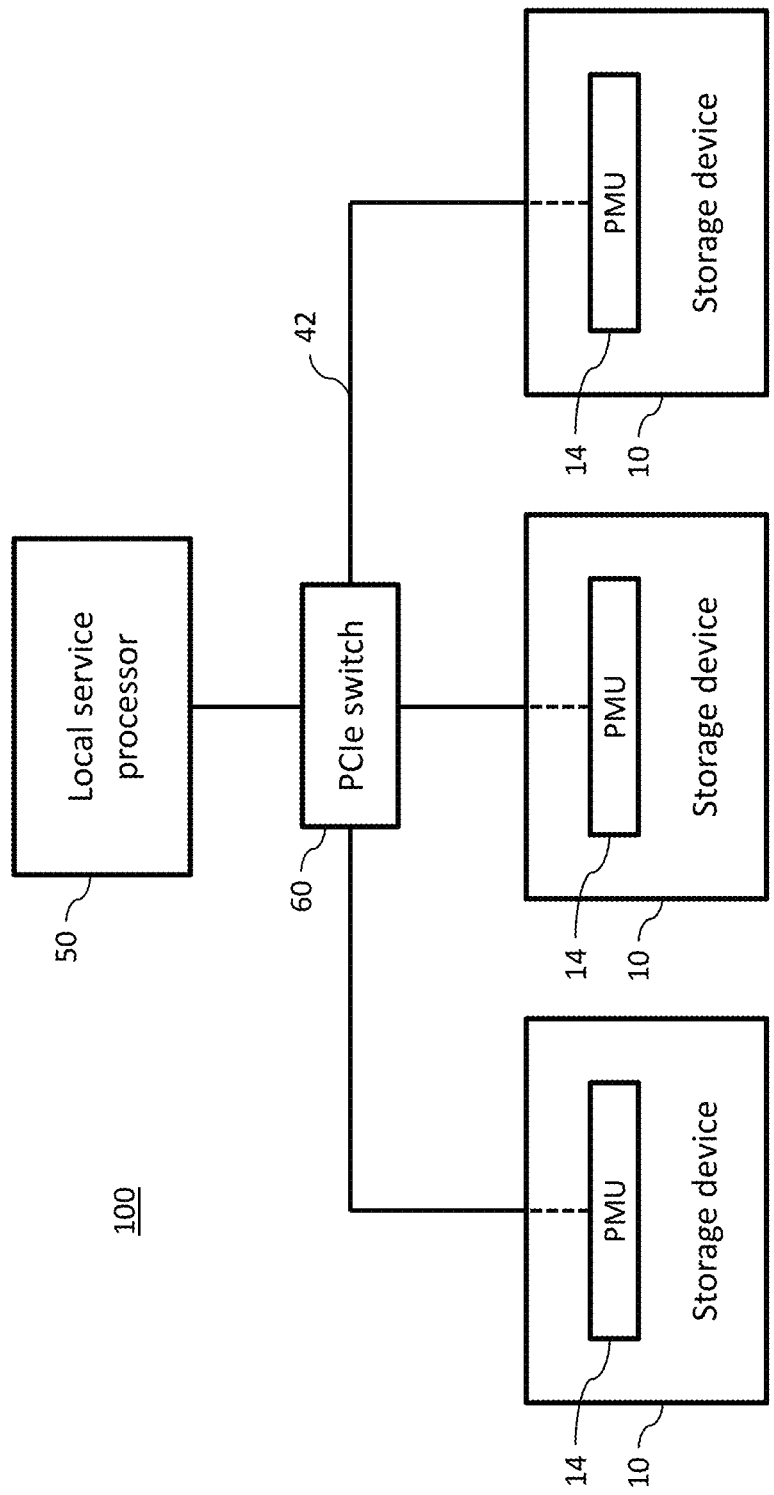
FIG. 4 is a block diagram of an embodiment of the storage system of FIG. 3 in which a PCIe switch is used.

FIG. 3 is a block diagram of a storage system 100 incorporating multiple storage devices 10. The storage system 100 includes the local service processor 50 attached to multiple storage devices 10. Each storage device 10 has a PMU 14 to measure power consumption as described above with respect to FIGS. 1 and 2. In the illustrated embodiment, the storage devices 10 provide power measurements to the local service processor 50 via the controller/host interface 42. In some embodiments, the controller/host interface 42 may be an I2C/SMBus or PCIe bus. The power measurements may be transferred to the local service processor 50 using NVMe protocols, such as NVMe-MI, MCTP over PCI-e, or I2C Bus protocols. If the storage device 10 is connected via a SMBus/I2C connection, the local service processor 50 can even access the power log during a power failure using these existing standard protocols.

FIG. 4 is a block diagram of an embodiment of the storage system 100 of FIG. 3 in which a PCIe switch 60 is used. In this embodiment, the storage devices 10 are connected to the local processor 50 via the PCIe switch 60. The power measurements may be transferred to the local service processor 50 via the PCIe switch 60 using suitable protocols such as, for example, NVMe-MI and/or MCTP.

In the embodiments of FIGS. 3 and 4, the local service processor 50 and the multiple storage devices 10 can be housed within the same chassis allowing the local service processor 50 to process the power measurements of the multiple storage devices 10 according to chassis power management requirements; however, the invention is not limited thereto. For example, power measurements can also be processed at the individual storage device level.

In embodiments in which the power measurements are transferred to the local service processor 50 using NVMe protocols, NVMe specifications can define power measurements and their process mechanism. Based on this mechanism, the storage devices 10 (e.g., an NVMe SSD) can support power management either queried by the local service processor 50 (FIG. 5) or set by the local service processor 50 (FIG. 6).

Figure 5:
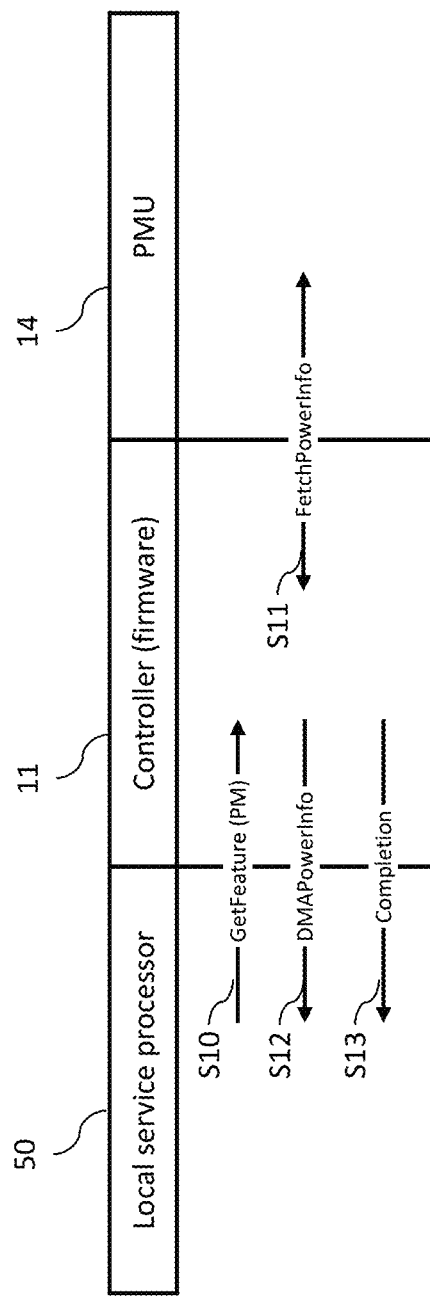
FIG. 5 is a diagram depicting an embodiment in which power measurements are transferred to a local service processor based on a query from the local service processor.

FIG. 5 is a diagram depicting an embodiment in which power measurements are transferred to the local service processor 50 based on a query from the local service processor 50. In this embodiment, the local service processor 50 queries the power measurement information by sending a GetFeature command (S10), for example, FeatureID=0x2, to the firmware of the controller 11 for the storage device 10 from which the local service processor 50 is seeking power measurement information. The controller's firmware then fetches (S11) the power measurement information from the PMU 14. The firmware of the controller 11 receives the information and sends (S12) that information via direct memory access (DMA) to the local service processor 50. The controller's firmware then sends (S13) a completion notice to the local service processor 50 to signal completion of the query. This embodiment allows for real-time retrieval of power measurements from the storage device 10.

Figure 6:
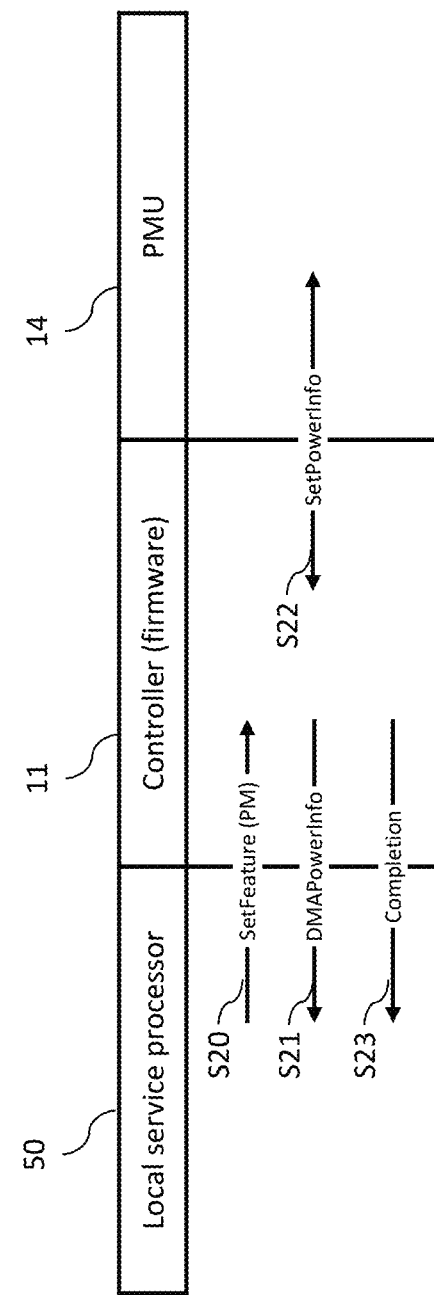
FIG. 6 is a diagram depicting an embodiment in which power measurements are set by the local service processor.

FIG. 6 is a diagram depicting an embodiment in which power measurements are set by the local service processor 50. In this embodiment, the local service processor 50 sets the power measurement information (hereinafter, called the power measurement budget) by sending a SetFeature command (S20), for example, FeatureID=0x2, to the firmware of the controller 11 for the storage device 10 for which the local service processor 50 intends to set the power measurement budget. The controller's firmware then uses DMA to request (S21) the power measurement budget from the local service processor 50. The firmware of the controller 11 receives the information and sets (S22) the power measurement budget of the PMU 14. In response, the controller's firmware processes the new power state transaction. In order to process the new power transaction, the controller's firmware queries the current power state job in the PMU 14 to ensure that all tasks that rely on the current power state are fully completed successfully. Then, the firmware changes the current power state from the current one to the next one required by the power measurement budget. The controller's firmware starts to process new tasks which rely on the power state using the allocated power measurement budget. The controller's firmware then sends (S23) a completion notice to the local service processor 50 to signal that the new power state has been set.

By enabling this SetFeature function, the local service processor 50 can control and throttle the power consumption of a particular storage device 10 to meet an allocated power budget of the local service processor 50. The controller 11 can enforce the power budget allocations programmed by the local service processor 50. If the actual power consumption exceeds the set threshold, the controller 11 can throttle the I/O performance for that parameter in order to minimize power consumption and to stay within the allocated power budget. The controller 11 can, for example, self-adjust by lowering the internal power state automatically when exceeding the allocated power budget. The controller 11 can then report back to the local service processor 50 so that the local service processor 50 can reallocate the available power to some other devices which may need additional power. The controller 11 may also collect statistics about such performance throttling on a fine granularity.

Figure 7:
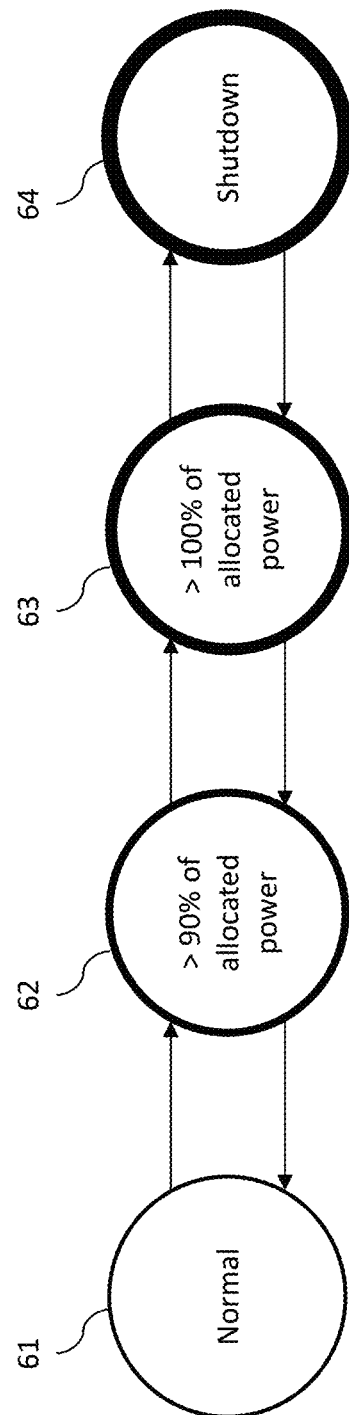
FIG. 7 shows an example of a power policy which can be used to by the local service processor 50 to control power consumption of a storage device.

FIG. 7 shows an example of a power policy which can be used by the local service processor 50 to control power consumption of a storage device 10. The local service processor 50 can manage the power policy by monitoring each storage device 10 in the storage system and instructing each storage device 10 to maintain its respective allocated power budget. For example, if a storage device 10 changes from operating at normal 61 to operating at greater than 90% of its allocated power budget, as shown at 62, the controller 11 may throttle I/O performance by, for example, introducing additional latency of a small percentage (e.g., 10% or 20% of idle or overhead). However, if the current state is greater than 100% of its allocated power budget, as shown at 63, the controller 11 may introduce a much bigger latency (e.g., 50% or larger) or may introduce delays to NAND cycles, etc., in order to throttle the storage device 10 to meet its allocated budget. If the storage device 10 continues to exceed its allocated budget despite the introduced latencies, the local service processor 50 may execute shutdown instructions 64 to shutdown the device 10 or the controller 11 may shutdown itself.

In further embodiments, the local service processor 50 can also monitor and detect thermal load increases (temperature rises) or operate the resource during peak utility rate such as hot day times or during brown-out periods to ensure that each storage device 10 is behaving as intended performance-wise.

The above feature makes the storage device capable of autonomous optimizing power vs. performance vs. assigned power budget/state.

Figure 8:
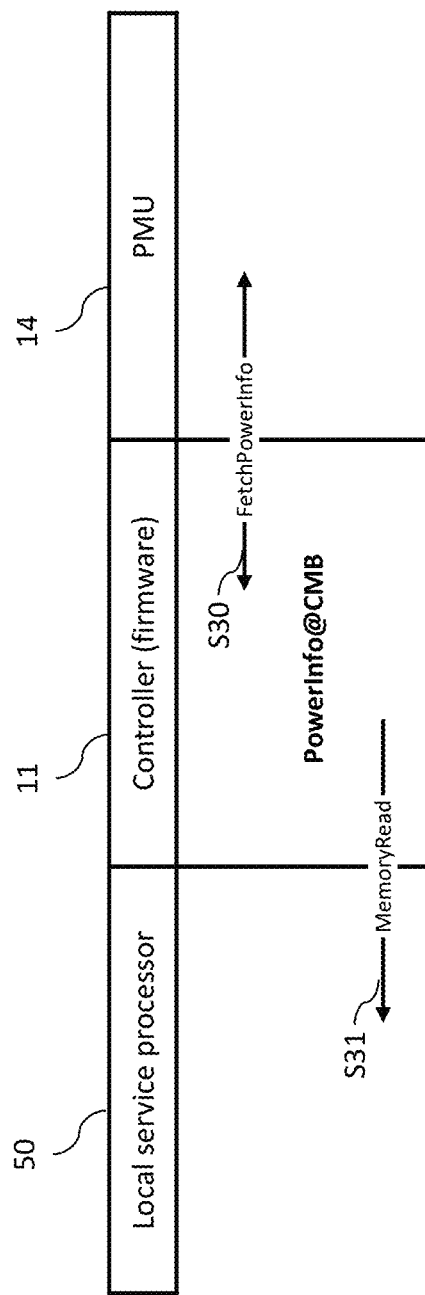
FIG. 8 is a diagram depicting an embodiment in which power measurements are stored in a controller memory buffer until fetched by the local service processor.

FIG. 8 is a diagram depicting a further embodiment in which power measurements are stored in the controller memory buffer until fetched by the local service processor 50. In this embodiment, the controller 11 can store the power measurements locally in its own memory 12 until requested by the local service processor 50. For example, the controller 11 could store the power measurement information in a controller memory buffer of the memory 12 in an embodiment in which the storage device 10 is an NVMe SSD. The NVMe specification define the controller memory buffer (CMB), which is a portion of the storage device's memory, but is assigned by the host/local service processor and owned by the host/local service processor logically.

The firmware of the controller 11 can fetch power measurement information from the PMU 14 and store it in the control memory buffer of the memory 12. The control memory buffer can be updated at any designated time unit. The local service processor 50 can then query the power measurement information by reading the power measurements directly from the controller memory buffer of the memory 12. The power measurements can be read from the control memory buffer via the controller/host interface 42. If the controller/host interface 42 is PCIe, the power measurement information can go through the PCIe to directly process memRd/memWr based on the BAR configuration in order to read from the control memory buffer. In other embodiments, the power measurement information can go through side band such as SMBus or I2C to directly access the control memory buffer.

Alternative to FIG. 8, the storage device 10 can be configured so that the PMU 14 is directly accessible by the local service processor 50 in order for the local service processor to be able to access the power measurement information when desired/needed and in real-time.

Figure 9:
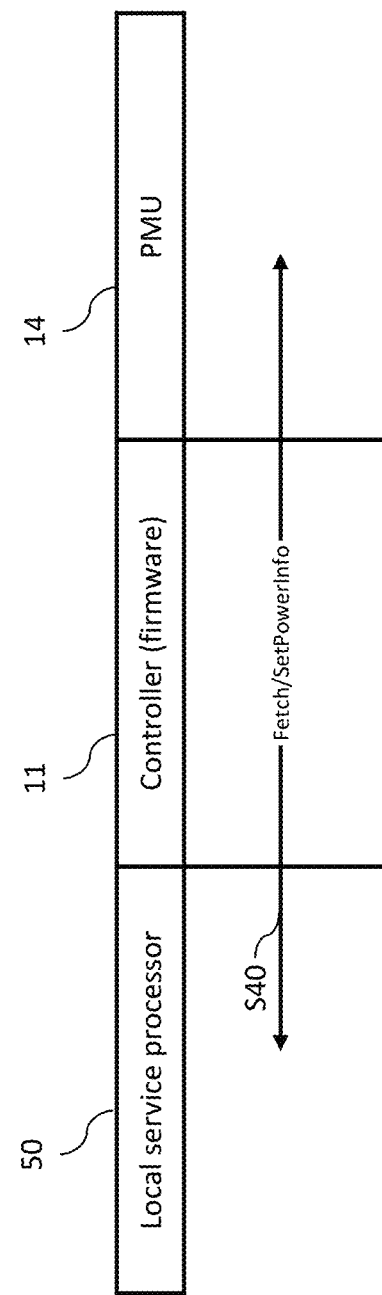
FIG. 9 is a diagram depicting an embodiment in which power measurements taken by a power measurement unit are directly accessible to the local service processor.

FIG. 9 is a diagram depicting an embodiment in which power measurements taken by the PMU 14 are directly accessible to the local service processor 50. In this embodiment, the storage device 10 can be configured with an assistant bus, such as, for example, I2C or AXI, to allow direct access to the PMU 14 by the local service processor 50. This allows the local service processor 50 to be able to process the power measurement information by accessing the PMU 14 directly and allows for retrieval of power measurements in real-time.

Figure 10:
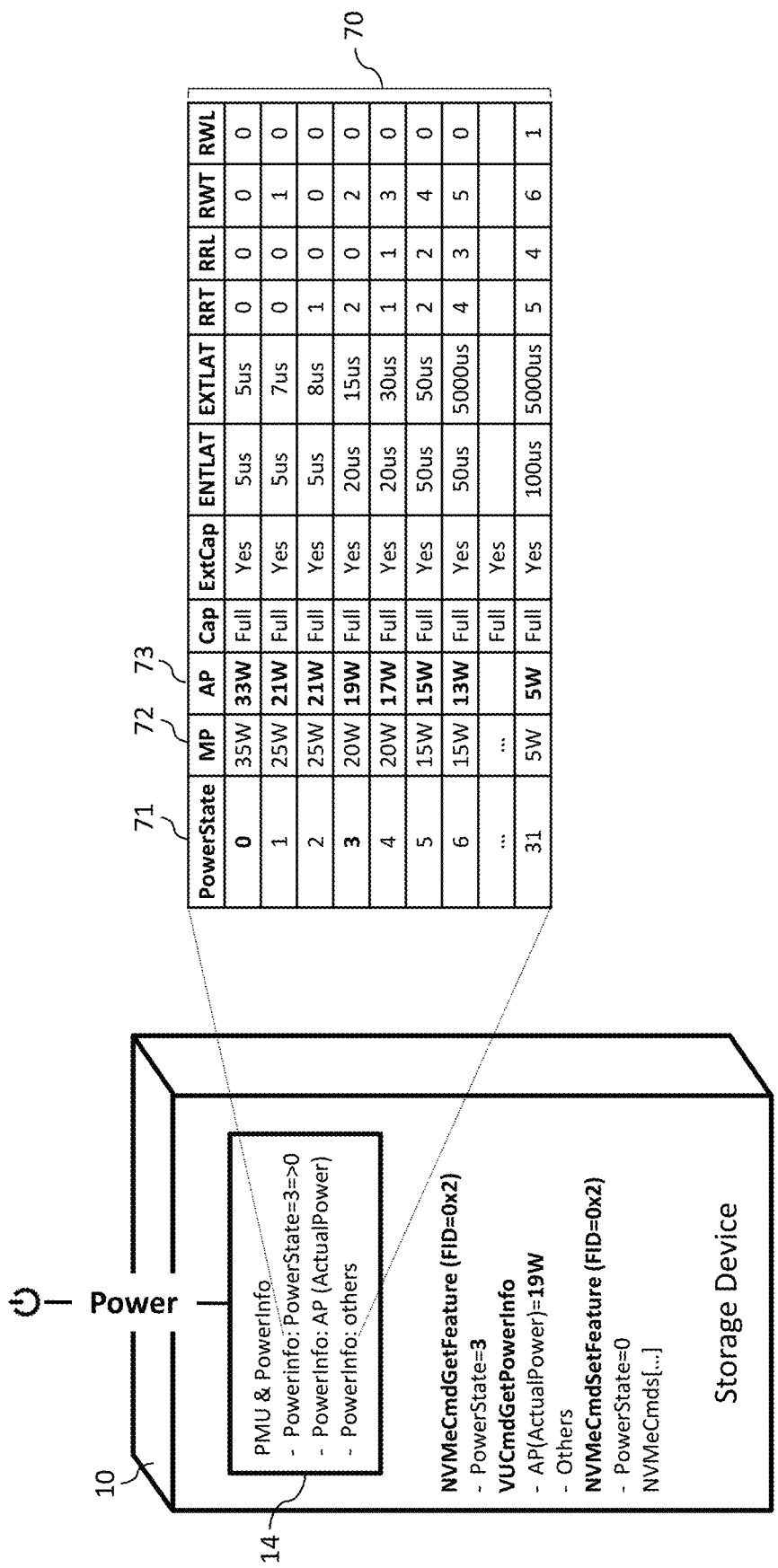
FIG. 10 is an example of a power log according to an embodiment of the present invention.

FIG. 10 is an example of a power log 70 according to an embodiment of the present invention. As illustrated in this embodiment, a storage device 10 may have, for example, up to 32 Power States (PowerState) 71, which are recorded in the power log 70. Each PowerState 71 has predefined performance information, a Maximum Power (MP) 72 capable of being utilized in that Power State 71 and an Actual Power (AP) 73 actually being used at that PowerState. AP 73 is a measured period according to the time unit (e.g., 1 minute) and Workload/QoS. In the current embodiment, each row in the power log 70 represents a power state which has been defined in the NVMe Specifications 1.3. For example, there are total 32 Power State defined in NVMe Specifications. In some embodiments, a vendor-specific definition can be used for each PowerState 71.

The power log 70 can include in its table entries the various PowerStates 71 and each PowerState's respective MP 72, AP 73 and additional information for identifying the power measurements and a relationship among Max Power/Power State, Actual Power, and QoS. QoS information can include, for example, current Entry Latency (ENTLAT), current Exit Latency (EXTLAT), RRT (Relative Read Throughput), RWT (Relative Write Throughput) and other suitable variables.

FIG. 10 illustrates a Power State_3 with a defined Max Power=20 W. However, the storage device 10 at this Power State currently consumes an Actual Power=19 W. Current QoS is shown in other columns such as RRT=2, RWT=2, ENTLAT=20 us and EXTLAT=30 us. If applications 80 run on the storage system 200 expect the best QoS (such as the best RRT & RWT), those applications 80 could instruct the local service processor 50 to give more power to the storage device 10 by transferring from Power State_3 to Power State_0.

The current PowerState 71 is retrieved by the local service processor 50 through the GetFeature (FeatureID=0x2), as discussed with respect to FIG. 5. An expected power state (i.e. power measurement budget) can be set by the local service processor 50 through the SetFeature (FeatureID=0x2), as discussed with respect to FIG. 6. Other power-related information can be managed by local service processor 50 through VUCmd (Vendor Unique Cmd) or directly accessed through the local service processor 50. For example, if the user would like to get power measurement information which is not defined in the NVMe specification, a VUCmd can be used to allow host retrieve such non-standard power information, similar to LogPage.

Figure 11:
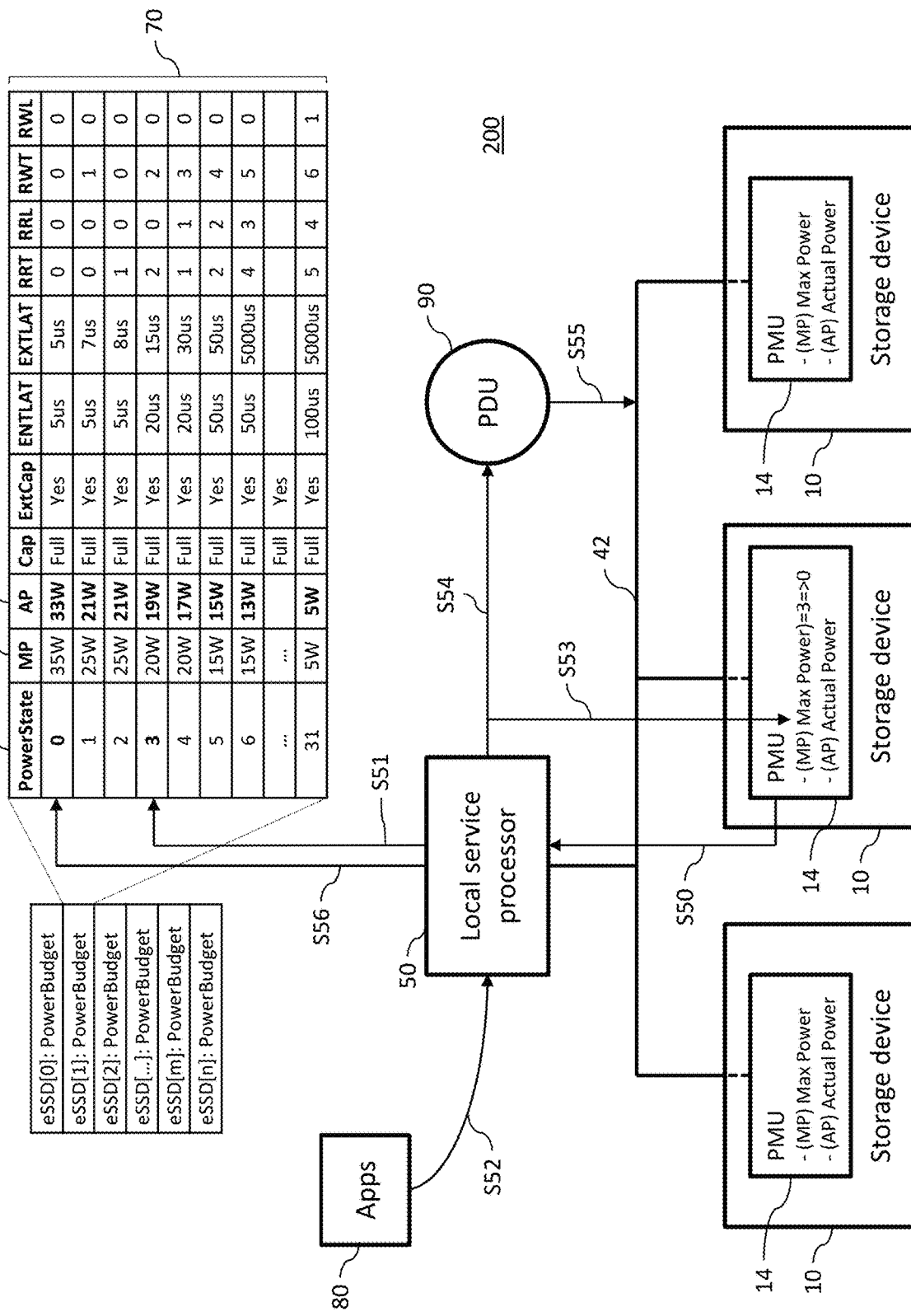
FIG. 11 is an illustrative method of how a storage system manages the power reporting of multiple storage devices in its chassis using the power log of FIG. 10.

FIG. 11 is an illustrative method of how a storage system 200 manages the power reporting of multiple storage devices 10 in its chassis. According to this method, each PMU 14 of each storage device 10 measures the current AP 73 and stores the information in the power log 70, which is queried and/or retrieved (S50) by the local service processor 50. The local service processor 50 then updates/uploads (S51) the power log 70 from the local service processor 50 to the storage system 200. Various applications 80 in the storage system 200 can analyze (S52) the power logs 70 of the storage devices 10 in the chassis at the local service processor 50. The results of these analyses can determine how to allocate power for better performance, e.g., whether more power needs to be allocated to a particular PowerState 71 or whether power should be reallocated from one PowerState 71 to another to meet QoS demands. For example, the local service processor 50 can request (S53) that the storage device 10, as illustrated with respect to the center storage device 10 shown in FIG. 10, transfer Max Power State, in this example, from PowerState 3 to PowerState 0. The local service processor 50 can then either assign a new MP 72 to the storage devices 10 or can request (S54) a power distribution unit (PDU) 90 to assign a new MP 72 budget to the storage devices 10, i.e. redistributing power allocations. If the PDU 90 is used, the PDU will then assign (S55) the new MP 72 to the storage devices 10. The PDU 90 may be an independent component located in the chassis and may responsible for distributing MP to each storage device 10. The local service processor 50 then updates (S56) the power log 70 with the changes.

As discussed above, once the local service processor 50 has access and can read the power measurements, the local service processor 50 can then use that information to create graphs or histograms to trend projections and to run diagnostics.

Embodiments of the present invention also enable the local service processor to provide individual actual power profiles of each storage devices in the system to software developers, cloud service providers, users and others by allowing them to know the actual power consumption of their workloads consumed on each storage device. This provides the ability for software developers/users to optimize performance based on the actual cost of energy and also allows cloud service providers to provide more accurate billing of storage system users based on actual power consumption. Embodiments of the present invention can also provide better policing and tracking of storage devices violating an allocated power budget.

Embodiments of the present invention may be used in a variety of areas. For example, the embodiments of the present invention provide building blocks of crucial information that may be used for analysis purposes for artificial intelligence software, such as Samsung's DCP. The embodiments also provide information that may be useful to an ADRC (Active Disturbance Rejection) High Efficient Thermal control based system.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed by appended claims and equivalents thereof.

Figure 12:
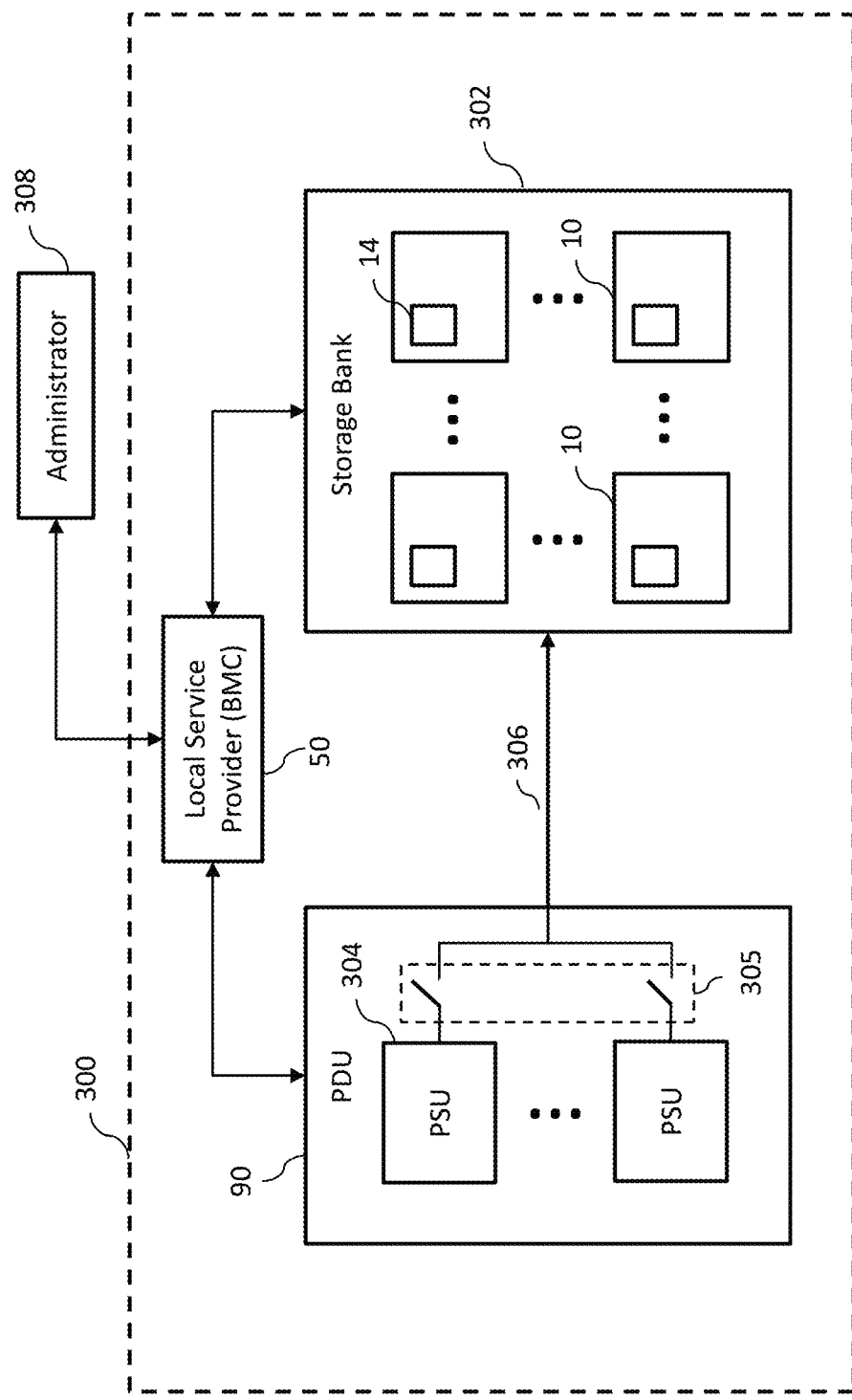
FIG. 12 is a block diagram illustrating a storage system utilizing a storage bank and a power distribution unit, according to some exemplary embodiments of the present invention.

FIG. 12 is a block diagram illustrating a storage system 300 utilizing a storage bank 302 and a power distribution unit (PDU) 90, according to some exemplary embodiments of the present invention.

In some embodiments, the storage bank (e.g., an Ethernet SSD chassis or Just-a-bunch-of-flashes (JBOF)) 302 includes a plurality of storage devices 10, and the PDU 90 includes a plurality of power supply units (PSUs or power supplies) 304 for supplying power to the storage devices 10 of the storage bank 302 under the direction of the local service processor (or BMC) 50. In some embodiments, the PSUs 304 are interchangeable, that is, each may have the same form factor and the same power supply capacity (e.g., have same output wattage); however, embodiments of the present invention are not limited thereto, and one or more of the PSUs 304 may have a power supply capacity that is different from other PSUs 304. In some examples, the plurality of PSUs 304 may be in an N+1 configuration in which N (an integer greater than or equal to 1) PSUs are sufficient to service the power needs of the storage bank 302, and an additional PSU 304 is provided as redundancy, which may be activated in the event that any of the PSUs experiences a failure.

As shown in FIG. 12, in some embodiments, the PSUs 304 may be coupled together using a switch network (e.g., a FET network) 305, rather than directly connected to the power bus 306, in order to protect the power bus 306 from electrical short circuits and transients when other PSUs 304 are connected. The switch network may include a plurality of switches (e.g., transistors) that are connected to the plurality of PSUs 304, on one end, and connected to the power bus 306, at the other end. According to some embodiments, the switches are independently controlled by the local service provider (BMC) 50, so that ny one of the PSUs 304 may be connected to, or disconnected from, the power bus 306, based on a control signal from the local service provider 50.

According to some embodiments, each storage devices 10 is configured to report its actual power consumption to the local service processor 50 via, for example, SMBus or PCI-e, and by, for example, NVMe-MI or MCTP protocols. The actual power consumption is measured by the PMU (i.e., power meter) 14, which may be internal to (e.g., integrated within) the storage device 10 (as shown in FIG. 12) or be external to, but coupled to, the storage device 10. The power consumption reporting enables the local service processor 50 to provide power profiles and perform analytics on the storage bank 302, which can in turn be used for diagnostics as well as offering value added services. This also allows each storage device 10 to more flexibly manage its own power usage as dictated by the system administrator 308, via the local service processor 50.

FIGS. 13A-13D illustrate histograms of power consumption of a storage system as generated by the local service processor 50, according to some exemplary embodiments of the present invention.

According to some embodiments, the local service processor 50 reads the power measurements periodically from the storage devices 10. In so doing, local service processor 50 may use NVMe-MI protocol over SMBus or PCIe to read the power log 70 pages, according to some examples. The local service processor 50 may then process the read power data to generate power usage trends, such as whole power usage of the storage bank 302 over time (e.g., per hour, during day time, night time, weekdays, or weekends, etc.), each storage device's 10 power consumption over time, relative power consumption of the storage devices 10 in a storage bank 302, and/or the like. In addition, the local service processor 50 may generate many derivative/additional graphs to learn about the power consumption behavior with respect to time, user, activity, etc. The local service processor 50 may also utilize such data for diagnostics purposes, power provisioning, future needs, cooling, and planning, etc.

Figure 13A:
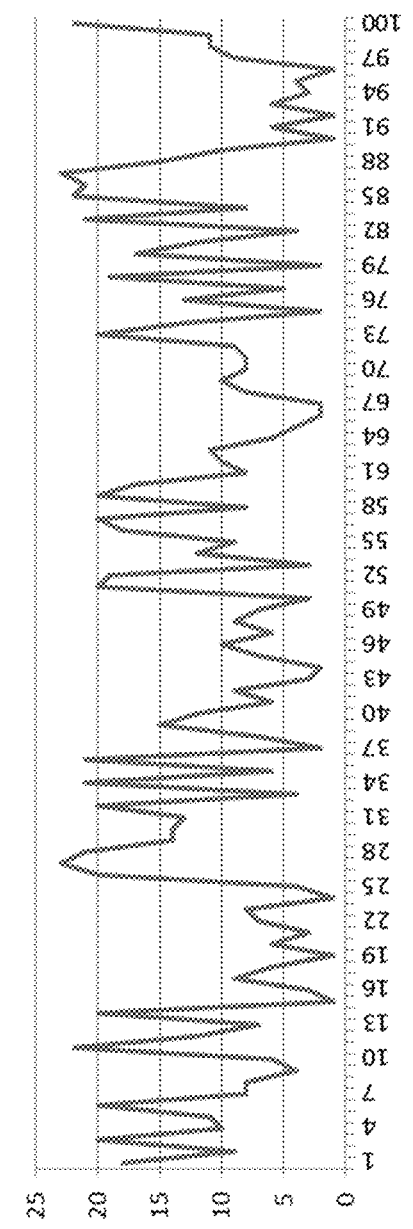
FIGS. 13A-13D illustrate histograms of power consumption of a storage system as generated by the local service processor, according to some exemplary embodiments of the present invention.

As an example, FIG. 13A illustrates the power consumption of a single storage device 10 over time. In FIG. 13A, the Y axis represents power consumption in terms of Watts, and the X axis represents time in terms of hours.

In some embodiments, the local service processor 50 manages host access policies, and receives raw power data and host IDs of active storage devices. Thus, according to some embodiments, the local service processor 50 is cognizant/aware of which host or application is accessing each storage device 10 at any given time, and is able to combine this information with power usage metrics to profile the power consumption by various hosts or applications. Such information can provide deeper insights into storage power needs to various applications and can be used to calculate the storage costs per host or application more accurately.

Figure 13B:

As an example, FIG. 13B illustrates power consumption by different hosts or applications. In FIG. 13B, the Y axis represents average power consumption in Watts over a period of time (e.g., per hour, day, etc.), and the X axis represents the host ID or application ID.

According to some embodiments, the local service processor 50 is capable of using power usage metrics for diagnostic purposes. In some embodiments, when abnormal power consumption is observed for a storage device 10, the local service processor 50 may alert the storage administrator 308. The abnormal power consumption may be a result of a fault within the storage device 10, or may be due to anomalous activity of the host or application that is accessing the storage device 10. For example, the faults may be a result of flash die or flash channel failures, which may initiate RAID like recovery mechanism consuming excess power; or higher bit rate errors in the media or volatile memory, which may cause error correction algorithms not to converge and spend more time and energy on a process. The local service processor 50 may query storage device health and status logs, such as SMART Logs, as well as proprietary diagnostic logs to assess abnormal behavior. Based on the policies set by the administrator 308, some of the abnormal behavior may be alerted to the administrator 308 for further action.

Figure 13C:
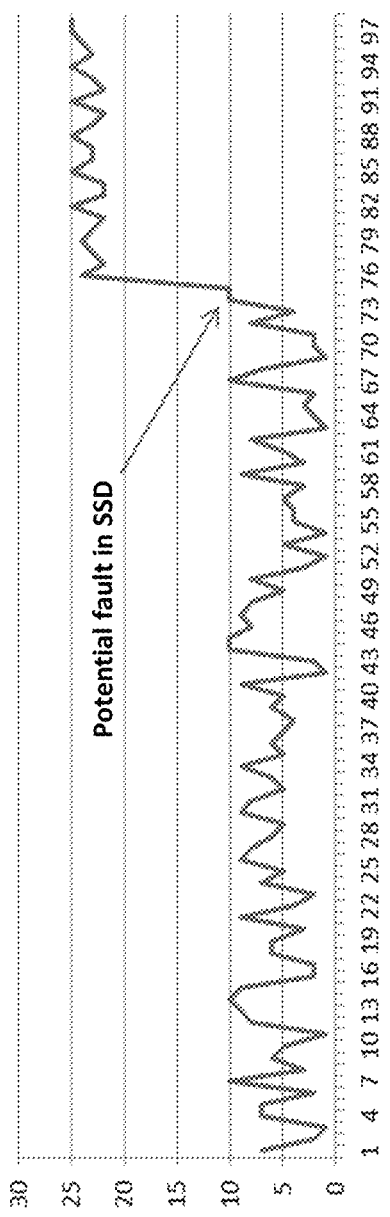

For example, FIG. 13C illustrates a potential fault detected in a storage device 10 when the power consumption per hour suddenly spikes about normal levels (e.g., 3-10 W/hr) to close to maximum values (e.g., around 25 W). In FIG. 13C, the Y axis represents average power consumption in Watts, and the X axis represents time in terms of hours. Thus, in some embodiments, the criterion for fault detection may be the derivative of power consumption being greater than a set threshold. However, embodiments of the present invention are not limited thereto, and the actual power consumption may be measured against storage device performance to determine if a fault has occurred or not. In some examples, the fault detection criteria/policy may be set by the administrator 308.

Figure 13D:
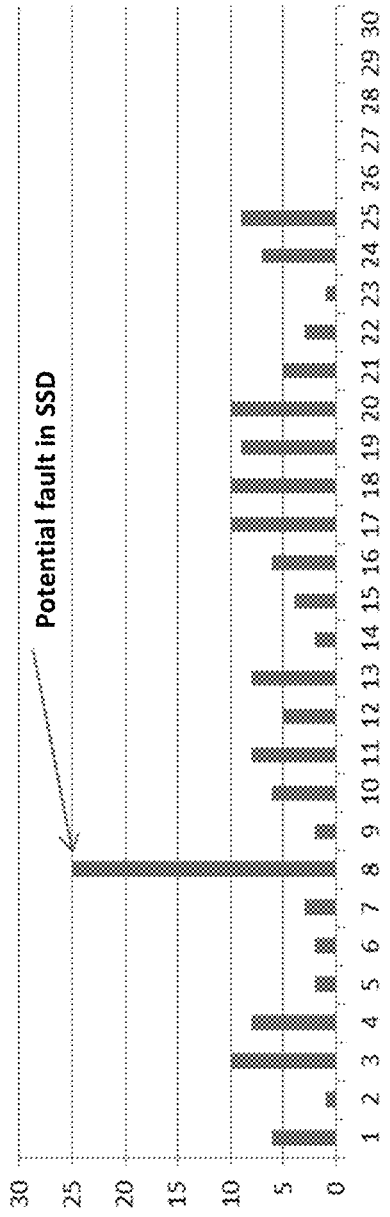

Further, FIG. 13D illustrates an example, in which a potential fault is detected in a storage device 10 (e.g., the storage device in slot #8). In this example, the storage device 10 may be expected to consume a maximum power of about 25 W at 1 MIOPS (one million input/output operations per second) of performance. However, if the average power consumption of storage device in slot #8 reaches the maximum power of about 25 W, but the average performance is much lower than 1 MIOPs, then the local service processor 50 may tag the storage device in slot #8 as potentially faulty or at least a good candidate for further fault analysis.

Accordingly, aspects of the present invention provide the building block of crucial information for other artificial intelligence SW to analyze. In addition, it also provides useful information for an ADRC (active disturbance rejection control), high-efficiency, thermal-control based system to take advantage of.

Figure 14:
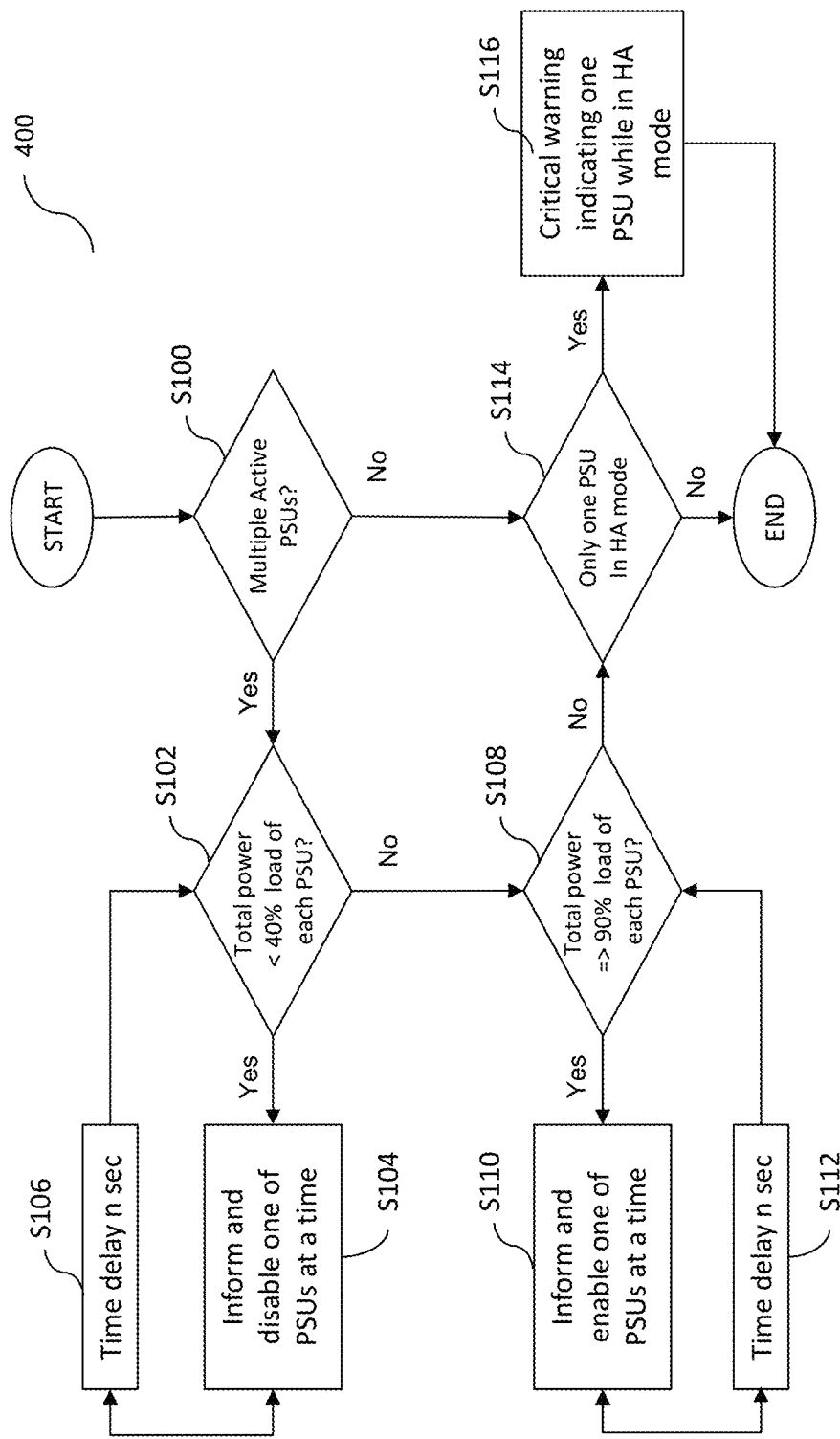
FIG. 14 is flow diagram illustrating a process of managing the operation of the power supplies of a storage system, according to some exemplary embodiments of the present invention.

FIG. 14 is flow diagram illustrating the process 400 of managing operations of the PDU 90, according to some exemplary embodiments of the present invention.

According to some embodiments, the local service provider 50 manages (e.g., optimizes) operations of the PDU 90 by dynamically monitoring the operation of the PSUs 304 of the PDU 90 and ensuring that active PSUs 304 operate in their high power-efficiency range. In so doing, the local service provider 50 determines (S100) whether the PDU 90 includes multiple active PSUs 304 or not. The active PSUs 304 may be connected to the power bus 306 through the switch network (i.e., have the corresponding witches turned on), and the deactivated PSUs 304 may be disconnected from the power bus 306 (e.g., by having the corresponding switches turned off). In some embodiments, the local service provider 50 determines the status of each PSU 304 in the PDU 90 through a bus (e.g., SMBus/PMBus), and is thus able to determine the number of PSUs 304 at the PDU 90. In some examples, the local service provider 50 reads the PSU status register of each PSU 304 present in the PDU 90 to determine its status (i.e., active/enabled or deactivated/disabled). If only one active PSU 304 is present, the local service provider 50 proceed to determine (S114) if the active PSU 304 is the only one PSU 304 present and is in HA mode (more on this below). Otherwise, the local service provider 50 determines (S102) whether the total power consumption of the storage bank 302 is less than a first percentage threshold (e.g., 40% or a value between 30% to 50%) of the load of each of the active PSUs 304. In some embodiments, the local power processor 50 does so by obtaining the actual power consumption of each storage device 10, as measured by the corresponding PMU 14, and adding together the actual power consumptions. In some examples, the local service provider 50 may obtain the actual power consumption of each storage device 10 by querying/retrieving the power log 70 from the storage device 10 or the PMU 14 corresponding to the storage device 10 (which may be internal to or external to the storage device 10).

If the total power consumption is less than the first percentage threshold of the load of each of the active PSUs 304, the active PSUs 304 may be operating in low power efficiency mode, which may be undesirable. As such, the local service provider 50 disables an active PSU 304 (S104), waits (S106) for a period of time (e.g., seconds or minutes), and rechecks (S102) whether the total power consumption of the storage bank 302 is still less than the first percentage threshold of the load of each of the active PSUs 304. If so, the loop continues and the local service provider 50 continues to disable the active PSUs 304 one by one until the total power consumption is equal to or greater than the first percentage threshold of the load of each of the active PSUs 304.

At that point, the local service provider 50 proceeds to determine (S108) whether the total power consumption of the storage bank 302 is greater than a second percentage threshold (e.g., about 90% or a value between 85% and 95%) of the load of each of the active PSUs 304. If so, the active PSUs 304 may be operating in high-power state, which may be detrimental to the longevity of the PSUs 304 if prolonged. As such, the local service provider 50 enables (i.e., activates) a disabled (i.e., a deactivated) PSU 304 (S110), waits (S112) for a period of time (e.g., seconds or minutes), and rechecks (S108) whether the total power consumption of the storage bank 302 is still equal to or greater than the second percentage threshold of the load of each of the active PSUs 304. If so, the loop continues and the local service provider 50 continues to enable the active PSUs 304 one by one until the total power consumption is less than the second percentage threshold of the load of each of the active PSUs 304.

At that point, the local service provider 50 proceeds to determine (S114) if only one PSU 304 is present in the PDU 90 while the storage system 300 is in high availability (HA) mode, which indicates multi-path 10 mode and N+1 redundant PSUs. Generally, in HA mode, the storage system 300 is in multi-path 10 mode and N+1 redundant PSUs are present to ensure that there is no single point of failure. As such, when only one PSU 304 is present in the PDU 90 while the system 300 is in HA mode, the local service provider 50 issues a warning (e.g., a critical warning) message (S116) to the system administrator 308 to install another redundant PSU 304 in the PDU 90. Otherwise, the system is operating normally and no warning message is sent to the system administrator 308.

Figure 15:
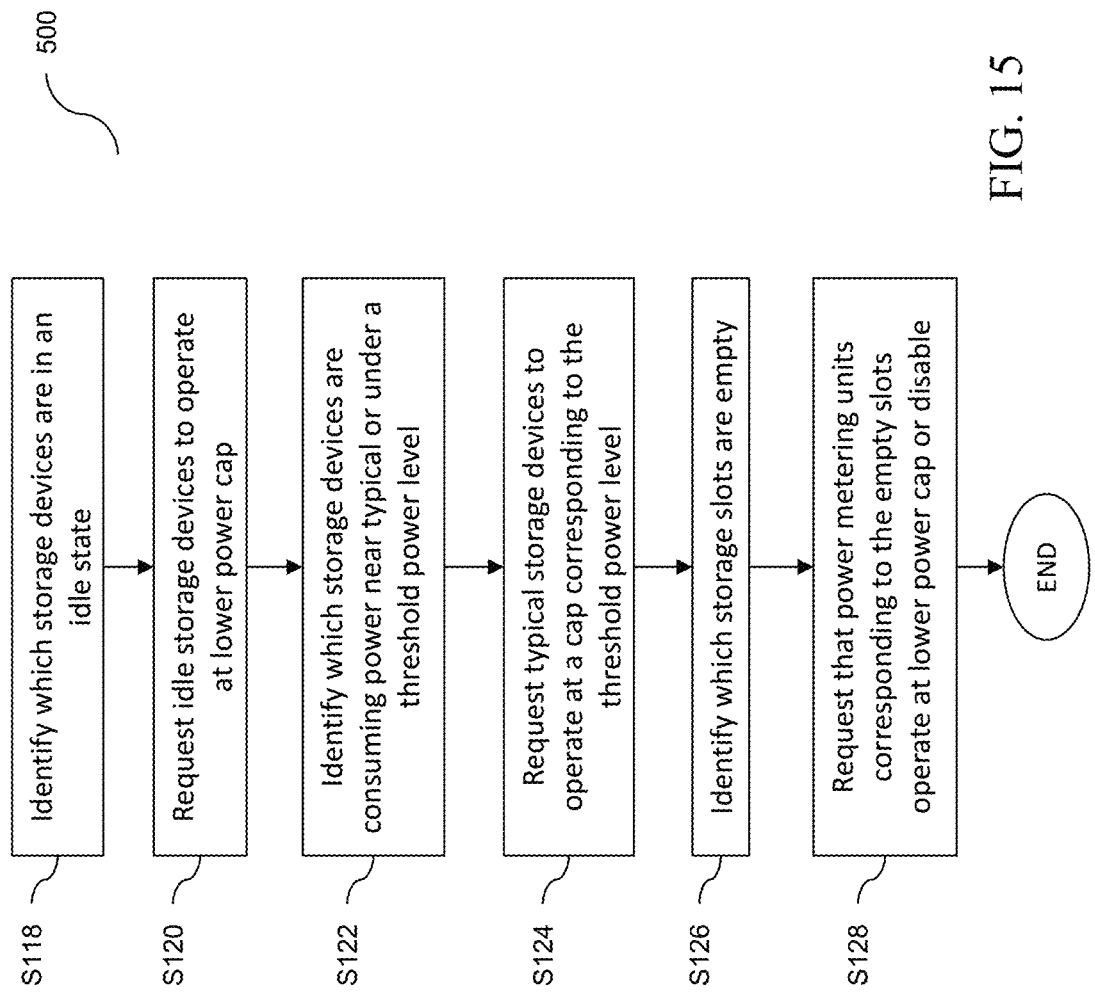
FIG. 15 is flow diagram illustrating a process of managing the storage devices of the storage system, according to some exemplary embodiments of the present invention.

FIG. 15 is flow diagram illustrating a process 500 of managing the storage devices 10 of the storage system 300, according to some exemplary embodiments of the present invention.

According to some embodiments, the local service provider 50 manages (e.g., optimizes) storage devices 10 by dynamically adjusting (e.g., lowering) their maximum power range or power cap based on the current workload of the storage bank 302.

In some embodiments, the local service provider 50 identifies (S118) which storage devices 10 of the storage bank 302 are in an idle state or consume near-idle power. Herein, an idle state may refer to an operational state in which a storage device 10 does not have any active or outstanding host commands such as read or write in its command queue for a period of time. That is to say that the host command queues of the storage device controller have been empty for a period of time, which may be programmable (e.g., by the system administrator 308). Near-idle power may be any power consumption that is below a set threshold, which may be programmable (e.g., by the system administrator 308). In some embodiments, the local power processor 50 obtains the actual power consumption of each storage device 10, which is measured by the corresponding PMU 14, by querying/retrieving the power log 70 from the storage device 10. The local service provider 50 then compares the actual power consumption with an idle power level. If consumed power of the storage device 10 is at or below the idle power level, the storage device is identified as being in an idle state. The local service provider 50 then instructs (S120) the identified storage devices 10 to operate at a lower power cap. For example, the local service processor 50 may instruct each of the identified storage devices 10 to change power states to a power state having a lower maximum power rating (e.g., change from PowerState 2 to PowerState 5). This may be done based on a power policy that is implemented by the local service provider 50 (and is, e.g., defined by the system administrator 308), which associates each power state to a range of actual power consumption.

According to some embodiments, the local service provider 50 identifies (S122) which storage devices 10 consume power at a level less than a threshold power level. In some examples, the threshold may be set at 75% of maximum power, which may be 25 W, or 75 W, etc., depending on the kind of PSUs and/or power connectors used.

In some embodiments, the local power processor 50 obtains the actual power consumption of each storage device 10, which is measured by the corresponding PMU 14, by querying/retrieving the power log 70 from the storage device 10. The local service provider 50 then compares the actual power consumption with threshold power level to determine if consumed power of the storage device 10 is below the threshold power level. The local service provider 50 then dynamically instructs the identified storage devices 10 to operate at a power cap corresponding to the first level (e.g., at 75% or 80% of maximum power), as opposed to the default power cap of 100% maximum power. Because the power efficiency of a PSU drops as it reaches its maximum load capacity, lowering the power cap of the storage devices 10 may bring down the overall power usage of the storage bank 302, thus allowing the PSU to operate at a lower power level and at a higher (e.g., peak) power efficiency range. This may be particularly desirable in large data centers, where overall power usage and cooling is a great concern.

In some examples, the local service provider 50 may dynamically instruct each of the identified storage devices 10 to operate at a lower power cap by instructing them to change their power state to one where the maximum power corresponds to (e.g., is at or less than) the threshold power level (e.g., the power states may be changed from Power-State 0 to PowerState 1).

In some embodiments, the local service provider 50 identifies (S126) which storage device slots are empty (i.e., not occupied by, or connected to, any storage device 10). In some examples, each storage device 10 may have a presence pin on the slot connector 15, which is used by the service provider 50 to determine whether the slot is empty or occupied by a storage device 10. If any of the empty slots have corresponding PMU 14 that are external to (i.e., not integrated with, and outside of) their corresponding storage devices 10 (e.g., may be at a power distribution board or at a mid-plane of the storage chassis), the local service provider 50 instructs (S128) that these PMUs 14 operate at lower power caps (e.g., operate at the lowest power state, PowerState 31) or disable/deactivate altogether. This will allow the storage bank 302 to eliminate or reduce unnecessary power usage.

While operations S118-S120, S122-S124, and S126-S128 are ordered in a particular sequence in FIG. 15, embodiments of the present invention are not limited thereto. For example, the operations S118-S120 can be performed after either or both of operations S122-S124 and S126-S128, and operations S126-S128 may be performed before either or both of operations S118-S120 and S122-S124.

The operations performed by the local service provider 50 (e.g., processes 400 and 500) may be described in terms of a software routine executed by one or more processors in the local service provider 50 based on computer program instructions stored in memory. A person of skill in the art should recognize, however, that the routine may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

What is claimed is:

1. A storage system comprising:
  a first storage device comprising a first power meter configured to measure a power consumption of the first storage device;
  a processor in communication with the first storage device; and
  a memory having stored thereon instructions that, based on being executed by the processor, cause the processor to perform:
    based at least in part on determining that the first storage device is in a first state, instructing the first storage device to operate at a second state associated with:
      a lower power cap than the first state;
      a higher entry latency than the first state; and
      a same exit latency as the first state.

2. The storage system of claim 1, wherein the first state is an idle state, and wherein the determining that the first storage device is in the first state comprises:
obtaining the power consumption of the first storage device by retrieving a power log from the first storage device;
comparing the power consumption of the first storage device with an idle power level; and
determining that the first storage device has a power consumption that is at or below the idle power level.

3. The storage system of claim 2, wherein the power log is configured to store an actual power consumption of a corresponding storage device as measured by the first power meter.

4. The storage system of claim 3, wherein the first power meter is internal to the first storage device.

5. The storage system of claim 2, wherein the power log is configured to record power measurement information measured by the first power meter.

6. The storage system of claim 1, wherein the instructing the first storage device to operate at the second state comprises instructing the first storage device to change to a lower maximum power rating.

7. The storage system of claim 1, further comprising a second storage device comprising a second power meter,
wherein the instructions further cause the processor to perform:
determining that the second storage device is consuming power under a threshold power level; and
based at least in part on determining that the second storage device is consuming power under the threshold power level, instructing the second storage device to change to a power state having a maximum power rating at the threshold power level,
wherein the determining that the second storage device is consuming power under the threshold power level comprises:
obtaining the power consumption of the second storage device by retrieving a corresponding power log from the second storage device;
comparing the power consumption of the second storage device with the threshold power level; and
determining that the second storage device has a power consumption that is below the threshold power level.

8. The storage system of claim 1, wherein the instructions further cause the processor to perform:
determining that one or more storage slots are not occupied by any storage device; and
based at least in part on determining that the one or more storage slots are not occupied by any storage device:
identifying one or more power meters associated with the one or more storage slots; and
instructing the one or more power meters to operate at a lower power capacity.

9. The storage system of claim 8, wherein the instructing the one or more power meters to operate at the lower power capacity comprises:
instructing the one or more power meters to operate at a lowest power state.

10. The storage system of claim 8, wherein the instructing the one or more power meters to operate at the lower power capacity comprises:
instructing the one or more power meters to deactivate.

11. A method of managing a storage system comprising a first storage device comprising a first power meter, the method comprising:

based at least in part on determining that the first storage device is in a first state, instructing the first storage device to operate at a second state associated with:
a lower power cap than the first state;
a higher entry latency than the first state; and
a same exit latency as the first state.

12. The method of claim 11, wherein the first state is an idle state, and
wherein the determining that the first storage device is in the first state comprises:
obtaining a power consumption of the first storage device by retrieving a power log from the first storage device;
comparing the power consumption of the first storage device with an idle power level; and
determining that the first storage device has a power consumption that is at or below the idle power level.

13. The method of claim 11, wherein the storage system further comprises a second storage device comprising a second power meter, and the method further comprises:
determining that the second storage device is consuming power under a threshold power level; and
based at least in part on determining that the second storage device is consuming power under the threshold power level, instructing the second storage device to change to a power state having a maximum power rating at the threshold power level,
wherein the determining that the second storage device is consuming power under the threshold power level comprises:
obtaining a power consumption of the second storage device by retrieving a corresponding power log from the second storage device;
comparing the power consumption of the second storage device with the threshold power level; and
determining that the second storage device has a power consumption that is below the threshold power level.

14. The method of claim 11, further comprising:
determining that one or more storage slots are not occupied by any storage device; and
based at least in part on determining that the one or more storage slots are not occupied by any storage device:
identifying one or more power meters associated with the one or more storage slots; and
instructing the one or more power meters to operate at a lower power capacity.

15. The method of claim 14, wherein the instructing the one or more power meters to operate at the lower power capacity comprises:
instructing the one or more power meters to operate at a lowest power state.

16. The method of claim 14, wherein the instructing the one or more power meters to operate at the lower power capacity comprises:
instructing the one or more power meters to deactivate.

17. A storage device comprising:
a power meter configured to measure a power consumption of the storage device;
a processor; and
a memory having stored thereon instructions that, based on being executed by the processor, cause the processor to perform:
based at least in part on determining that the storage device is in a first state, instructing the storage device to operate at a second state associated with:
a lower power cap than the first state;
a higher entry latency than the first state; and a same exit latency as the first state.

\* \* \* \* \*